(12) United States Patent
Lee et al.

(10) Patent No.: US 7,103,245 B2
(45) Date of Patent: Sep. 5, 2006

(54) HIGH DENSITY INTEGRATED OPTICAL CHIP

(75) Inventors: Kevin K. Lee, Cambridge, MA (US); Desmond R. Lim, Cambridge, MA (US); Kazumi Wada, Lexington, MA (US); Lionel C. Kimmerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/043,896

(22) Filed: Jan. 9, 2002

(65) Prior Publication Data

US 2003/0012493 A1 Jan. 16, 2003

Related U.S. Application Data

(63) Continuation-in-part of application No. 09/978,310, filed on Jun. 26, 2001, now Pat. No. 6,697,551, and a continuation-in-part of application No. 09/893,263, filed on Jun. 27, 2001, now Pat. No. 6,690,871, and a continuation-in-part of application No. 09/876,392, filed on Jun. 7, 2001, now Pat. No. 6,850,683, which is a continuation-in-part of application No. 09/841,464, filed on Apr. 24, 2001, now Pat. No. 6,631,225.

(60) Provisional application No. 60/234,845, filed on Sep. 22, 2000, provisional application No. 60/217,168, filed on Jul. 10, 2000, provisional application No. 60/217,167, filed on Jul. 10, 2000.

(51) Int. Cl.
G02B 6/14 (2006.01)

(52) U.S. Cl. .............................. 385/28; 385/43; 385/50

(58) Field of Classification Search ............ 385/27–32, 385/39, 50, 43, 49
See application file for complete search history.

(56) References Cited

U.S. PATENT DOCUMENTS

| | | | |
|---|---|---|---|
| 4,412,722 A | 11/1983 | Carnevale et al. | 350/96.31 |
| 4,725,110 A | 2/1988 | Glenn et al. | 350/3.61 |
| 4,773,720 A | 9/1988 | Hammer | 350/96.2 |
| 5,148,317 A | 9/1992 | Foresi | 359/566 |
| 5,158,908 A | 10/1992 | Blonder | 437/129 |
| 5,199,092 A | 3/1993 | Stegmueller | 385/50 |
| 5,229,883 A | 7/1993 | Jackson et al. | 359/569 |
| 5,287,427 A | 2/1994 | Atkins et al. | 385/124 |
| 5,343,542 A * | 8/1994 | Kash et al. | 385/31 |
| 5,360,982 A | 11/1994 | Venhuizen | 385/14 |
| 5,563,970 A | 10/1996 | Little et al. | 385/42 |
| 5,600,483 A | 2/1997 | Fan et al. | 359/344 |

(Continued)

FOREIGN PATENT DOCUMENTS

EP  0 473 362 A2  8/1991

(Continued)

OTHER PUBLICATIONS

Lee et al., "Fabrication of Ultralow-loss Si/SiO2 Waveguides by Roughness Reduction," Optics Letters, vol. 26, No. 23, Dec. 1, 2001, pp. 1888-1890.

(Continued)

*Primary Examiner*—Andrew Schechter
*Assistant Examiner*—George Y. Wang
(74) *Attorney, Agent, or Firm*—Gauthier & Connors LLP

(57) ABSTRACT

A high density integrated optical chip. The optical chip features an optical function connected to a low minimum bending radius dielectric waveguide, and a large mode field size dielectric waveguide to interface with an external optical device, such as an optical fiber. The large mode field size dielectric waveguide is optically connected to the low minimum bending radius dielectric waveguide on the optical chip.

33 Claims, 13 Drawing Sheets

U.S. PATENT DOCUMENTS

| | | | |
|---|---|---|---|
| 5,668,900 A | 9/1997 | Little et al. | 385/37 |
| 5,682,401 A | 10/1997 | Joannopoulos et al. | 372/96 |
| 5,710,849 A | 1/1998 | Little et al. | 385/50 |
| 5,737,458 A | 4/1998 | Wojnarowski et al. | 385/15 |
| 5,777,793 A | 7/1998 | Little et al. | 359/584 |
| 5,790,583 A | 8/1998 | Ho | 372/92 |
| 5,825,799 A | 10/1998 | Ho et al. | 372/92 |
| 5,838,870 A | 11/1998 | Soref | 385/131 |
| 5,841,931 A | 11/1998 | Foresi et al. | 385/131 |
| 5,878,070 A | 3/1999 | Ho et al. | 372/92 |
| 5,926,496 A | 7/1999 | Ho et al. | 372/92 |
| 5,938,811 A | 8/1999 | Greene | 65/385 |
| 5,955,749 A | 9/1999 | Joannopoulos et al. | 257/98 |
| 5,990,850 A | 11/1999 | Brown et al. | 343/912 |
| 6,009,115 A | 12/1999 | Ho | 372/92 |
| 6,052,495 A | 4/2000 | Little et al. | 385/2 |
| 6,058,127 A | 5/2000 | Joannopoulos et al. | 372/92 |
| 6,069,729 A | 5/2000 | Gill et al. | 359/245 |
| 6,078,605 A | 6/2000 | Little et al. | 372/94 |
| 6,101,300 A | 8/2000 | Fan et al. | 385/27 |
| 6,108,464 A | 8/2000 | Foresi et al. | 385/14 |
| 6,125,225 A | 9/2000 | Dianov et al. | 385/124 |
| 6,130,969 A | 10/2000 | Villeneuve et al. | 385/27 |
| 6,134,043 A | 10/2000 | Johnson et al. | 359/237 |
| 6,195,187 B1 | 2/2001 | Soref et al. | 359/114 |
| 6,198,860 B1 | 3/2001 | Johnson et al. | 385/28 |
| 6,222,973 B1 | 4/2001 | Starodubov | 385/128 |
| 6,233,381 B1 | 5/2001 | Borrelli et al. | 385/37 |
| 6,236,773 B1 | 5/2001 | Butler et al. | 385/14 |
| 6,253,015 B1 | 6/2001 | Ukrainczyk | 385/130 |
| 6,259,847 B1 | 7/2001 | Lenz et al. | 385/131 |
| 6,298,180 B1 | 10/2001 | Ho | 385/15 |
| 6,311,003 B1 | 10/2001 | Dubey et al. | 385/130 |
| 6,326,325 B1 | 12/2001 | Dawson-Elli et al. | 501/96.5 |
| 6,341,184 B1 | 1/2002 | Ho et al. | 385/3 |
| 2001/0000714 A1 | 5/2001 | Borrelli et al. | 385/37 |
| 2001/0002941 A1 | 6/2001 | Borrelli et al. | 385/37 |
| 2002/0034352 A1 | 3/2002 | Williams et al. | 385/16 |

FOREIGN PATENT DOCUMENTS

| | | |
|---|---|---|
| EP | 0 726 476 A1 | 8/1996 |
| EP | 0 829 119 B1 | 12/2001 |
| WO | WO 97/44870 | 11/1997 |
| WO | WO 97/44871 | 11/1997 |
| WO | WO 98/25314 | 6/1998 |
| WO | WO 98/26316 | 6/1998 |
| WO | WO 98/53535 | 11/1998 |
| WO | WO 98/57207 | 12/1998 |
| WO | WO 99/09440 | 2/1999 |
| WO | WO 99/17151 | 4/1999 |
| WO | WO 00/10040 | 2/2000 |
| WO | WO 00/17679 | 3/2000 |
| WO | WO 00/43827 A1 | 7/2000 |
| WO | WO 00/48026 | 8/2000 |
| WO | WO 00/72063 A1 | 11/2000 |
| WO | WO 00/72064 A1 | 11/2000 |
| WO | WO 00/72065 A1 | 11/2000 |
| WO | WO 01/18598 | 3/2001 |
| WO | WO 01/20379 A1 | 3/2001 |
| WO | WO 01/22139 A1 | 3/2001 |
| WO | WO 01/22141 A1 | 3/2001 |
| WO | WO 01/23955 A2 | 4/2001 |
| WO | WO 01/23955 A3 | 4/2001 |
| WO | WO 01/24243 A1 | 4/2001 |
| WO | WO 01/31387 A1 | 5/2001 |
| WO | WO 01/38905 A2 | 5/2001 |
| WO | WO 01/38910 A1 | 5/2001 |
| WO | WO 01/38915 A1 | 5/2001 |
| WO | WO 01/38921 A2 | 5/2001 |
| WO | WO 01/38921 A3 | 5/2001 |
| WO | WO 01/38922 A2 | 5/2001 |
| WO | WO 01/38924 | 5/2001 |
| WO | WO 01/38925 A1 | 5/2001 |
| WO | WO 01/39823 A1 | 5/2001 |
| WO | WO 01/45194 A2 | 6/2001 |
| WO | WO 01/48532 A2 | 7/2001 |
| WO | WO 01/59492 A2 | 8/2001 |
| WO | WO 01/61387 | 8/2001 |
| WO | WO 01/61389 A2 | 8/2001 |
| WO | WO 01/61805 A1 | 8/2001 |
| WO | WO 01/65593 A1 | 9/2001 |
| WO | WO 01/96922 A1 | 12/2001 |
| WO | WO 01/99223 A2 | 12/2001 |
| WO | WO 02/04999 A2 | 1/2002 |
| WO | WO 02/05000 A2 | 1/2002 |

OTHER PUBLICATIONS

Rickman et al., "Silicon-on-Insulator Optical Rib Waveguides: Loss, Mode Characteristics, Bends and Y-Junctions," IEEE Proc.-Optoelectron. vol. 141, No. 6, Dec. 1994 pp. 391-393.

Wong et al., "Fabrication of UV-Sensitive Waveguides for Integrated Photonics Applications," Proc. SPIE vol. 4110, pp. 316-321.

Tyschenko et al., "Enhancement of the Intensity of Violet and Green Photoluminescence from Ge+ ion-implanted SiOxNy Films Caused by Hydrostatic Pressure During Annealing," Optical Materials, vol. 17 (2001) pp. 99-102.

Ridder et al., "Silicon Oxynitride Planar Waveguide Structures for Application in Optical Communication," IEEE Journal of Selected Topics in Quantam Electronics, vol. 4, No. 6, Nov./Dec. 1998, pp. 930-937.

Kashyap et al., "Laser-Trimmed Four-Port Bandpass Filter Fabricated in Single-Mode Photosensitive Ge-Doped Planar Waveguide," IEEE Photonics Technology Letters, vol. 5, No. 2, Feb. 1993, pp. 191-194.

Kashyap, "Photosensitive Optical Fibers: Devices and Applications," Optical Fiber Technology, vol. 1 (1994) pp. 17-34.

Bazylenko et al., "Photosensitivity of Ge-doped Silica Deposited by Hollow Cathode PECVD," Electronic Letters, Jun. 20, 1996, vol. 31, No. 13, pp. 1198-1580.

Nishii, "Permanent Index Changes in Ge-SiO2 Glasses by Excimer Laser Irradiation," Materials Science and Engineering, vol. B54 (1998), pp. 1-10.

Little et al., "Ultra-Compact Si-SiO2 Microring Resonator Optical Channel Dropping Filters," IEEE Photonics Technology Letters, vol. 10, No. 4, Apr. 1998, pp. 549-551.

Rafizadeh et al., "Waveguide-coupled AlGaAs/GaAs Microcavity Ring and Disk Resonators with High Finesse and 21.6-nm Free Spectral Range," Optical Letters, vol. 22, No. 16, Aug. 15, 1997, pp. 1244-1246.

Forest, "Photonic-bandgap Microcavities in Optical Waveguides," Nature, vol. 390, Nov. 13, 1997, pp. 143-145.

Bilodeau, et al., "Photosensitization of Optical Fiber and Silica-on-Silcon/Silica Waveguides," Optics Letters, Jun. 15, 1993, vol. 18, No. 12, pp. 953-955.

Malo et al., "Ultraviolet Light Photosensitivity in Ge-doped Silica Fibers: Wavelength Dependence of the Light-Induced Index Change," Optics Letters, Sep. 1, 1990, vol. 15, No. 17, pp. 953-955.

Kohnke et al., "Silica based Mach-Zehnder add-drop Filter Fabricated With UV Induced Gratings," Electronics Letters, vol. 32, No. 17, Aug. 15, 1996, pp. 1579-1580.

Heimala et al., "Thermally Tunable Integrated Optical Ring Resonator With Poly-Si Thermistor," Journal of Lightwave Technology, vol. 14, No. 10, Oct. 10, 1996, pp. 2260-2267.

Popovic et al., "Micron-size Bending Radii in Silica-based Waveguides," Research Laboratory of Electronics, Massachusetts Institute of Technology, 10 pages.

Barbier, "Media for Lightwave: Erbium-doped Waveguide Amplifiers Promote Optical-Networking Evolution," website: Lightwave-fiber-optic communications, bandwith access and telecommunications//lightwave.archives.printthis.click . . . , printed Aug. 8, 2001.

Krishnaswamy et al., "Optical Properties of Strip-Loaded Er-doped Waveguides," Optical Materials, Nov. 1996, vol. 6, pp. 287-292.

Chelnokov et al., "Deep High-dose Erbium Implantation of Low-loss Silicon Oxynitride Waveguides," Electronic Letters, vol. 30, No. 2, Oct. 27, 1994, pp. 1850-1852.

Wong et al., "Ion-exchanged Er-Yb Codoped Phosphate Glass Optical Amplifiers," Department of Electrical Engineering, City University of Hong Kong, 2 pages.

Moerman et al., "A Review on Fabrication Technologies for the Monolithic Integration of Tapers with III-V Semiconductor Devices," IEEE Journal of Selected Topics in Quantam Electronics, vol. 3, No. 6, Dec. 1997, pp. 1308-1320.

Schwander et al., "Simple and Low-loss Fibre-to-Chip Coupling by Integrated Field-Matching Waveguide IN InP," Electronic Letters, Feb. 18, 1993, vol. 29, No. 4, pp. 326-328.

Brenner et al., "Integrated Optical Modeshape Adapters in InGaAsP/InP for Efficient Fiber-to-Waveguide Coupling," IEEE Photonics Technology Letters, vol. 5, No. 9, Sep. 1993, pp. 1051-1056.

Suematsu et al., "Propagation Mode and Scattering Loss of a Two-Dimension Dielectric Waveguide with Gradual Distribution of Refractive Index," IEEE Transactions on Microwave Theory and Techniques, vol. MTT-20, No. 8, Aug. 1972, pp. 524-531.

Augusciuk et al., "Precise Control of the Modal Number of the Low-Mode Channel Gradient Index Waveguides," SPIE, vol. 2943, pp. 128-133.

Zengerle et al., "Laterally Tapered InP-InGaAsP Waveguides for Low-Loss Chip-to-Fiber Butt Coupling: a Comparison of Different Configurations," IEEE Photonics Technology Letters, vol. 7, No. 5, May 1995, pp. 532-534.

Danko et al., "Index Profile of Graded-Index Channel Waveguides," Applied Optics, vol. 25, No. 9, May 1, 1986, pp. 1505-1507.

Shih et al., "Graded Index Polymer Channel Waveguide Array for Backplane Optical Interconnects," SPEI Nonconducting Photopolymers and Applications, vol. 1774, 1992, pp. 97-102.

\* cited by examiner

LIGHT TRAVELS IN THE Si CORE

HIGH DENSITY INTEGRATED OPTICAL CHIP

PRIORITY INFORMATION

This application is a continuation-in-part of U.S. application Ser. No. 09/978,310, filed Jun. 26, 2001 now U.S. Pat. No. 6,697,551,which is a continuation-in-part of U.S. application Ser. No. 09/841,464, filed Apr. 24, 2001 now U.S. Pat. No. 6,631,225, which in turns claims the benefit of U.S. Provisional Application No. 60/217,168, filed Jul. 10, 2000. This application is also a continuation-in-part of U.S. application Ser. No. 09/893,263, filed Jun. 27, 2001 now U.S. Pat. No. 6,690,871, which claims the benefit of U.S. Provisional Application No. 60/217,167, filed Jul. 10, 2000, and a continuation-in-part of U.S. application Ser. No. 09/876,392, filed Jun. 7, 2001 now U.S. Pat. No. 6,850,683, which claims the benefit of U.S. Provisional Application No. 60/234,845, filed Sep. 22, 2000. All of these prior applications are incorporated herein by reference.

FIELD

The present invention relates generally to a high density optical chip and, more generally, to an optical chip including at least one high index difference waveguide.

BACKGROUND OF THE INVENTION

Integrated optical chips with optical functions typically use low index difference waveguides, and these optical chips generally contain up to only two or three optical functions. FIG. 1 shows a typical planar dielectric waveguide, which is an example of a two-dimensional waveguide. Low index difference waveguides, such as those used in optical chips and for the optical fiber waveguides for input to and output from optical chips, are three-dimensional versions of such planar dielectric waveguides. These low index difference waveguides 10 include a core material 12 surrounded by a cladding material 14. The core material 12 can have an arbitrary cross-section, including a circular, elliptical, square, or rectangular cross-section embedded in the cladding material 14. The index of refraction $n_1$ of the core material 12 is slightly larger than the index of refraction $n_2$ of the cladding material 14. The index difference $\Delta n$ for the index of refraction $n_1$ of the core material 12 and the index of refraction $n_2$ of the cladding material 14 ($\Delta n = n_1 - n_2$) is therefore generally very small. A useful metric is delta ($\Delta$), which is defined as $\Delta_n / n_{cladding}$ for this type of waveguide, and is generally around 0.01 (1 percent) to 0.04 (4 percent), and certainly less than 0.1 (10 percent). In other words:

$$\Delta = \frac{n_1 - n_2}{n_2} \ll 1.$$

A ray of light moving in the z direction in FIG. 1 (from left to right) is guided by total internal reflection within the core material 12 if the angle of incidence $\theta$ of the ray with respect to the interface between the core material 12 and the cladding material 14 is larger than a critical angle $\theta_c$. This critical angle $\theta_c$ equals $\sin^{-1}(n_2/n_1)$. For low index difference waveguides, due to the indices of refraction $n_1$, $n_2$, the angle of incidence $\theta$ must be large in order for total internal reflection to guide the light ray through the waveguide.

The typical optical chips having low index difference waveguides are generally large, wafer-sized chips. This large size results because the low index difference waveguides can adequately guide light only if bends in the waveguides have large radii. If small bending radii are used with these low index difference waveguides, large losses result because light is loosely confined within the core material 12. Low index difference waveguides therefore function adequately without large losses only with relatively high bending radii, and it is therefore difficult to perform optical functions in small areas using these low index difference waveguides.

The use of higher index difference waveguides reduces the minimum bending radii while maintaining adequate performance (that is, low loss), and therefore reduces the area required to perform the optical functions. The index of refraction $n_1$ of the core material 12 is significantly larger than the index of refraction $n_2$ of the cladding material 14 for such a higher index difference waveguide. Delta ($\Delta$) for a high index difference waveguide is typically at least as large as 0.1, 0.2, or 0.3. In other words:

$$\Delta = \frac{n_1 - n_2}{n_2} \geq 0.1.$$

In such a high index difference waveguide, total internal reflection of light propagating through the waveguide is achieved for smaller angles of incidence $\theta$ for a ray of light, and the minimum bending radii for which performance is adequate is reduced.

The use of high index difference waveguides does have drawbacks. Because the fiber optic waveguides used for input to and output from optical chips are typically low index difference waveguides, a higher loss results in the coupling between the low index difference optical fiber waveguides and the high index difference waveguides on the optical chip. In addition, scattering loss increases for higher index difference waveguides, and therefore a larger loss in optical signals can result over a shorter length than for typical low index difference waveguides.

SUMMARY OF THE INVENTION

The invention features a high density integrated optical chip. Under one aspect of the invention, the optical chip features a low minimum bending radius dielectric waveguide, a large mode field size dielectric waveguide, and an optical function. The optical function is connected to the low minimum bending radius dielectric waveguide, and the large mode field size dielectric waveguide interfaces with an external optical device, such as an optical fiber. The large mode field size dielectric waveguide is optically connected to the low minimum bending radius dielectric waveguide on the optical chip. The optical function can be any structure or device that is used to generate, modify, and/or measure the amplitude, frequency, wavelength, dispersion, timing, propagation direction, and/or polarization properties of one or more light pulses. In other embodiments, a plurality of low minimum bending radius dielectric waveguides and optical functions can exist on the optical chip, and the low minimum bending radius dielectric waveguides can connect the optical functions. Such an embodiment can include a plurality of large mode field size dielectric waveguides used for input/output for the optical chip. These embodiments allow large numbers of optical functions to be integrated on a single optical chip having a small footprint.

According to another aspect of the invention, the optical chip described above can feature a low minimum bending radius dielectric waveguide including a high index core material, a cladding region generally surrounding the high index core material, and a graded index region applied between at least one side of the high index core material and the cladding region. This graded index region reduces scattering loss at the interface between the high index core material and the cladding region.

According to another aspect of the invention, a coupler can be used to couple the low minimum bending radius dielectric waveguide to the large mode field size dielectric waveguide on the optical chip. Such a coupler can feature a first dielectric channel waveguide including a first core material having a first tapered region surrounded by a cladding material, and a second dielectric channel waveguide including a second core material having a second tapered region surrounded by the cladding material. A portion of the second tapered region can be embedded within the first tapered region, and a first mode for propagating light defined by the first dielectric channel waveguide gradually transforms into a second mode defined by the second dielectric channel waveguide. In such an embodiment, the first dielectric channel waveguide of the coupler can be optically connected to the large mode field size dielectric waveguide of the optical chip, and the second dielectric channel waveguide of the coupler can be optically connected to the low minimum bending radius dielectric waveguide.

DETAILED DESCRIPTION OF THE EMBODIMENTS OF THE INVENTION

The embodiments of the invention provide optical chips with low minimum bending radius waveguides. Very briefly, the optical chip includes one or more low minimum bending radius waveguides and optical functions integrated with one or more large mode size waveguides. The large mode size waveguide is used to communicate with optical devices that are external to the optical chip. These external optical devices can include optical fibers or other optical chips.

Figure 1:
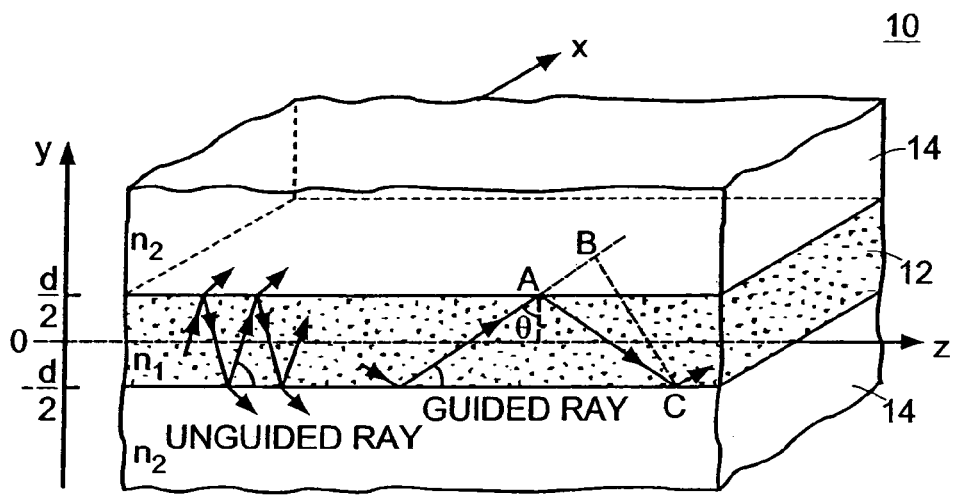
FIG. 1 is a perspective view of a prior art planar dielectric waveguide.
Figure 2:
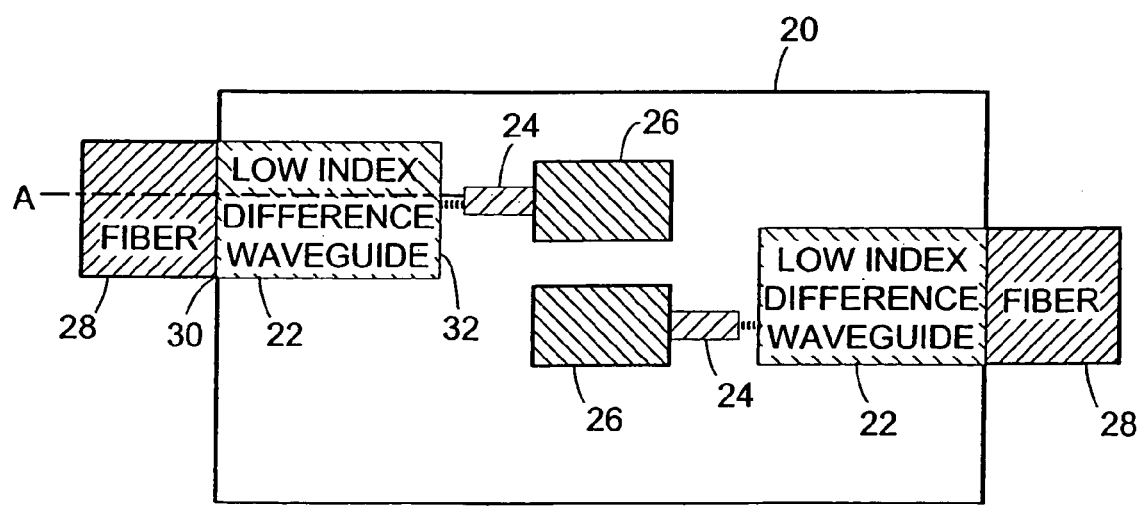
FIG. 2 is a block diagram of an optical chip according to one embodiment of the invention.

FIG. 2 is a top view of an optical chip according to a first embodiment of the invention. The optical chip of FIG. 2 includes at least one large mode size waveguide 22, at least one low minimum bending radius waveguide 24, and at least one optical or electro-optical function 26 fabricated on a substrate 20. The embodiment of the optical chip of FIG. 2 depicts two low minimum bending radius waveguides 24, with each low minimum bending radius waveguide 24 being optically connected to a different large mode size waveguide 22 and optical function 26. In other embodiments, a single large mode size waveguide 22, a single low minimum bending radius waveguide 24, and a single optical function 26 can be disposed on the substrate 20, and in still other embodiments more than two of each of these components can be disposed on the substrate 20.

The large mode field size waveguide 22, low minimum bending radius waveguide 24, and optical function 26 are fabricated monolithically on a single substrate 20. A number of other components can also be bonded in any manner on the substrate 20, including separate optical functions or waveguides. The substrate 20 can be made from any material, including silicon, indium phosphide, ceramic, or quartz. The substrate 20 can also be shaped in a variety of forms, including a rectangular, square, elliptical, or circular shape with a thin side profile. Generally, an optical chip includes a planar substrate 20 and patterned core materials and cladding layers that define a planar lightwave circuit (PLC) or optical circuit. At least one large mode field size waveguide 22 on the substrate 20 has a first end 30 that terminates on a side, edge, or accessible portion of the substrate 20 so that it can be connected to an external optical device, such as the optical fiber 28 shown in FIG. 2. A second end 32 of the large mode field size waveguide 22 can be optically coupled to one of the low minimum bending radius waveguides 24 on the substrate 20. The large mode field size waveguide 22 on substrate 20, therefore, can serve as an input/output port for the optical chip. Further, the optical chip can contain functions that change the information carrier signal from an optical signal to a difference form of energy, or vice versa. Examples of alternate forms of energy that carry information include acoustic (sound/audio), radio frequency, infrared, and microwave, as well as other bands of the electromagnetic spectrum At least one optical function 26 is connected to one of the low minimum bending radius waveguides 24 on the substrate 20. An optical function 26 is generally any structure or device that is used to generate, modify, and/or measure the amplitude, frequency, wavelength, dispersion, timing, propagation direction, and/or polarization properties of one or more light pulses. Optical functions 26 can include splitters, couplers, modulators, switches, filters, isolators, detectors, and amplifiers. A single optical function 26, therefore, is a structure that performs at least one function, such as those listed above. The optical function or functions 26 can be chosen for a wide variety of applications. In addition, the optical functions 26 can be integrated with electrical functions and electro-optical functions on a single substrate 20. If a single optical chip contains multiple optical or electro-optical functions 26, low minimum bending radius waveguides 24 can be used to interconnect these optical or electro-optical functions 26.

Figure 3:
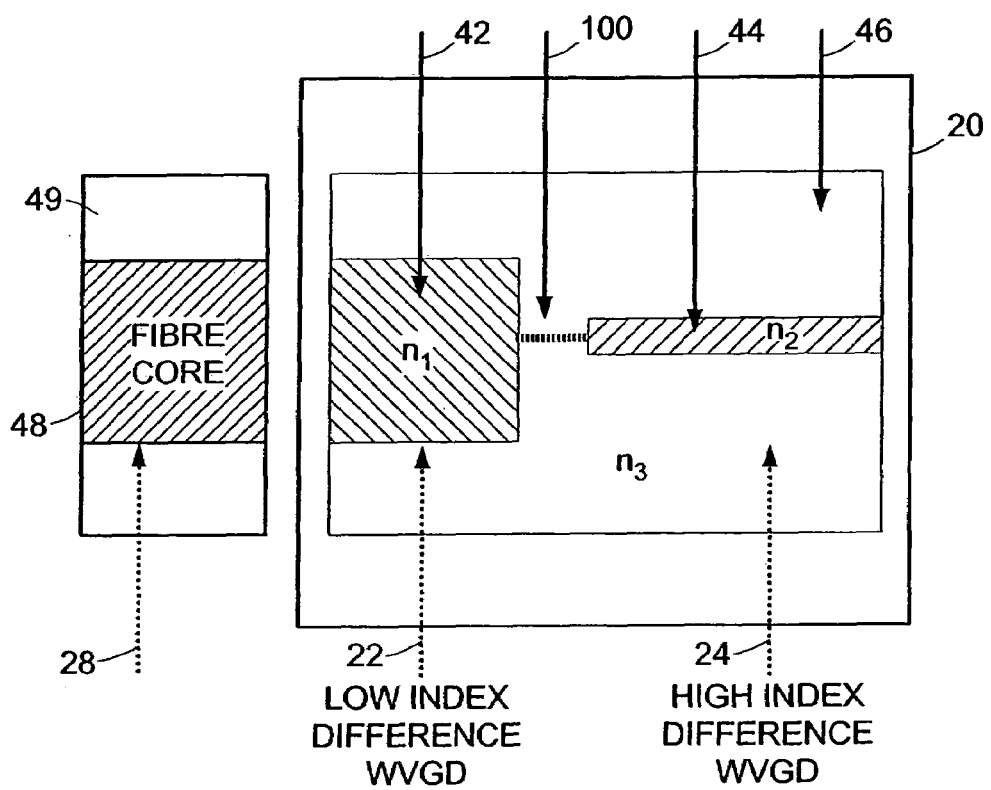
FIG. 3 is an enlarged cross-sectional view of a portion of the optical chip of FIG. 2.

FIG. 3 is a cross-sectional view of the optical chip of FIG. 2 that shows a single large mode field size waveguide 22 and a single low minimum bending radius waveguide 24 coupled on the substrate 20. A coupler or transformer 100 is used to couple the large mode field size waveguide 22 to the low minimum bending radius waveguide 24 on the substrate 20. A variety of couplers or transformers 100 can be used within the scope of the invention to provide this coupling function. One suitable coupler 100 is described in detail below.

The large mode field size waveguide 22 can, in one embodiment, be a low index difference waveguide that is a channel waveguide, although in other embodiments other types of waveguides can be used as the large mode field size waveguide 22. Generally, the large mode field size waveguide has a mode field size similar to that of external optical fiber, which is a low index difference waveguide. The low index difference waveguide 22 of FIG. 3 includes a core material 42 having an index of refraction $n_1$ and a cladding material 46 having an index of refraction $n_3$. Similarly, the high index difference waveguide 24 includes a core material 44 having an index of refraction $n_2$ and a cladding material 46 having an index of refraction $n_3$. The index of refraction $n_3$ of the cladding material 46 is less than the index of refraction $n_1$ of the low index core material 42, which is less than the index of refraction $n_2$ of the high index core material 44. In the embodiment of FIG. 3, the low index difference waveguides 22 and the low minimum bending radius waveguide 24 both have the same cladding material 46 surrounding their cores 42, 44, although in other embodiments different cladding materials can be used. As used throughout this specification, a low index difference waveguide is a waveguide where delta ($\Delta$) for the index of refraction $n_1$ of the core material 42 and the index of refraction $n_3$ of the cladding material 46 is generally very small, such as less than 0.1 (10 percent). In other words:

$$\Delta = \frac{n_1 - n_3}{n_3} < 0.1.$$

In some embodiments, this index difference $\Delta n$ is such that $\Delta$ is less than 0.01 (1 percent) or less than 0.04 (4 percent). A high index difference waveguide, on the other hand, is a waveguide where delta ($\Delta$) for the index of refraction $n_2$ of the core material 44 and the index of refraction $n_3$ of the cladding material 46 is at least 0.1. In other words:

$$\Delta = \frac{n_2 - n_3}{n_3} \geq 0.1.$$

In other embodiments, the index difference $\Delta n$ is such that $\Delta$ for a high index difference waveguide is at least 0.2, and for still other embodiments, $\Delta$ is at least 0.3. In some embodiments of the invention, the low minimum bending radius waveguides 24 can be high index difference waveguides.

For the low index difference waveguide 22, the index of refraction $n_1$ of the core material 42 and the index of refraction $n_3$ of the cladding material 46 are chosen so that the low index difference waveguide 22 has an effective index of refraction and mode size close to that of the external optical fiber 28. The external optical fiber 28 includes a core material 48 surrounded by a cladding material 49. The core material 48 of the optical fiber 28 can have a square, rectangular, elliptical, or circular cross-section or, in other embodiments, an arbitrary cross-section can be used. In one embodiment, the same geometry and indices of refraction can be chosen for the low index difference waveguide 22 on the substrate 20 as are used for the external optical fiber 28. The coupling loss between the external optical fiber 28 and the low index difference waveguide 22 is minimized by matching the mode size of the low index difference waveguide 22 to that of the external optical fiber 28. In addition, reflection is minimized by matching the effective index of refraction of the low index difference waveguide 22 to that of the external optical fiber 28.

The indices of refraction $n_1$, $n_3$ of the low index core 42 and the cladding material 46 are, in one embodiment, chosen so that the low index difference waveguide 22 has a mode field 1/e diameter size of at least 2 microns. The mode field 1/e diameter (the mode size) is the diameter of the mode where the optical field amplitude is 1/e of the peak optical field amplitude. In this embodiment, the core material 42 and the cladding material 46 are chosen to make the mode field 1/e diameter size large enough to maximize the coupling throughput and error tolerance with the external optical fiber 28.

To design a waveguide by mode size, the following procedure can be used. For a particular selection of refractive indices $n_1$, $n_3$ and for a certain wavelength of light that will propagate through the waveguide, the dimensions of the waveguide can be selected to be less than or equal to the single mode cut-off dimension, and this dimension determines the mode size. The lower limit of the mode field 1/e diameter size of about 2 microns, therefore, ensures that the mode field 1/e diameter size of the low index difference waveguide 22 will remain large enough to effectively couple to external optical fibers 28. In other embodiments, this lower limit of the mode field 1/e diameter can be about 3 microns or, in still other embodiments, 5 microns. Typical optical fiber waveguides have mode field 1/e diameter sizes of about 8–10 microns. In one embodiment, therefore, the low index difference waveguide 22 can have a mode field 1/e diameter size of about 8–10 microns. An upper range of the mode field 1/e diameter size of the low index difference waveguide 22 can be the largest mode field 1/e diameter size typically used for external optical fibers 28. In one embodiment, such an upper range for the mode field 1/e diameter size can be about 15–20 microns, although this upper mode field 1/e diameter size can vary widely.

Throughout this specification, a large mode field size waveguide (or large mode size waveguide) is a waveguide that has a mode field 1/e area similar to that of a waveguide having a mode field 1/e diameter of at least 2 microns. In such an embodiment, for instance, the mode field 1/e area would be π square microns. Similarly, in an embodiment where the mode field 1/e diameter is 3 microns, the mode field 1/e area would be about 2.25π square microns. More particularly, a large mode field size waveguide could have a mode field 1/e area of about 16π square microns (for an 8 micron mode field 1/e diameter) or 25π square microns (for a 10 micron mode field 1/e diameter). Such a large mode field size waveguide having an 8–10 micron diameter can include optical fiber. A large mode field size waveguide can be a waveguide of any configuration, including but not limited to a channel waveguide.

In one embodiment, as mentioned above, the large mode field size waveguide 22 on the substrate 20 can be a low index difference waveguide 22. The low index difference waveguide 22 can have a core material 42 made from silica and a cladding material 46 made from doped silica. A blunt connection or coupler of any variety can be used to connect the external optical fiber 28 to the low index difference waveguide 22 on the substrate 20. For instance, an end of the optical fiber 28 can be abutted to an end of the low index difference waveguide 22, and these two ends can be adhered together. Because the material and design of the low index difference waveguide 22 can be chosen to match the external optical fiber 28, a low coupling loss, such as about 1 decibel (dB) or less, can result between the external optical fiber 28 and the low index difference waveguide 22. The external optical fiber 28 shown in FIGS. 2 and 3 can be replaced by any low index difference waveguide, and not only the optical fiber 28 shown in the Figures. The external optical fiber 28 could therefore represent an input or output from another optical chip on a substrate or could be any other optical device.

The low minimum bending radius waveguide 24 allows for the miniaturization of optical functions 26 on the substrate 20. A small optical chip with a large number of optical functions 26 can therefore result. Because low minimum bending radius waveguides have smaller bending radii than large mode size waveguides and low index difference waveguides, optical functions 26 and bending and splitting of propagating light can be implemented in smaller areas using these low minimum bending radius waveguides. A "minimum bending radius" can be defined as the radius for a 90 degree bend in which the loss during the bend is less than or equal to a certain amount, such as 0.5 dB in one embodiment. In other embodiments, a minimum bending radius can be for a loss of less than or equal to 0.1 dB in a 90 degree turn or, in still other embodiments, a loss of less than or equal to 0.01 dB in a 90 degree turn. Throughout this specification, the term "low minimum bending radius" will be used to refer to a radius of less than or equal to 50 microns for a 90 degree bend in which the loss during the bend is less than or equal to 0.5 dB. As an example, the minimum bending radius for a high index difference waveguide having a delta (Δ) of 0.3, $n_{cladding}$ of 1.5, and having a 1 micron by 1 micron core dimension can be less than or equal to 50 microns and, in other embodiments, less than or equal to 20 microns, and in still other embodiments, less than or equal to 10 microns. Such a waveguide is a low minimum bending radius waveguide. As another example, the minimum bending radius for a low index difference waveguide where Δ is 0.01, $n_{cladding}$ is 1.5, and having a 10 micron by 10 micron core dimension is on the order of 1 cm. Such a waveguide is not a low minimum bending radius waveguide.

The use of low minimum bending radius waveguides on the optical chip allows for the integration of a large number of optical functions 26 on a single substrate 20. The optical functions 26 and low minimum bending radius waveguides 24 on the substrate 20 communicate with external optical fibers 28, chips, or optical devices through the large mode field size waveguides 22 on the substrate 20. Whereas typical wafer-sized chips with low index difference waveguides can be approximately 10 centimeters by 10 centimeters in dimension with about 1 to 3 or 4 optical functions, an optical chip on substrate 20 using low minimum bending radius waveguides 24 can be about 1 centimeter by 1 centimeter in dimension with 1 to 10,000 or more optical functions. In any event, more than 5 or more than 10 optical functions can be performed on substrate 20 using low minimum bending radius waveguides in a smaller area than is used for wafer-sized chips using low index difference waveguides.

As mentioned above, the large mode size waveguides can be low index difference waveguides and the low minimum bending radius waveguides can be high index difference waveguides in one embodiment of the invention. The following discussion is for such an embodiment, although other large mode size waveguides and low minimum bending radius waveguides can be used in other variations of the embodiments disclosed below.

Referring again to FIG. 2, the optical chip can contain more than one input or output low index difference waveguides 22. In FIG. 2, for instance, a first low index difference waveguide 22 provides for a first input/output port from the optical chip, and a second low index difference waveguide 22 provides for a second input/output port from the optical chip. In addition, each of the optical functions 26 depicted in FIG. 2 could be coupled to more than one high index difference waveguide 24. The particular design of the optical chip depends on the application for which the optical chip will be used.

Figure 4:
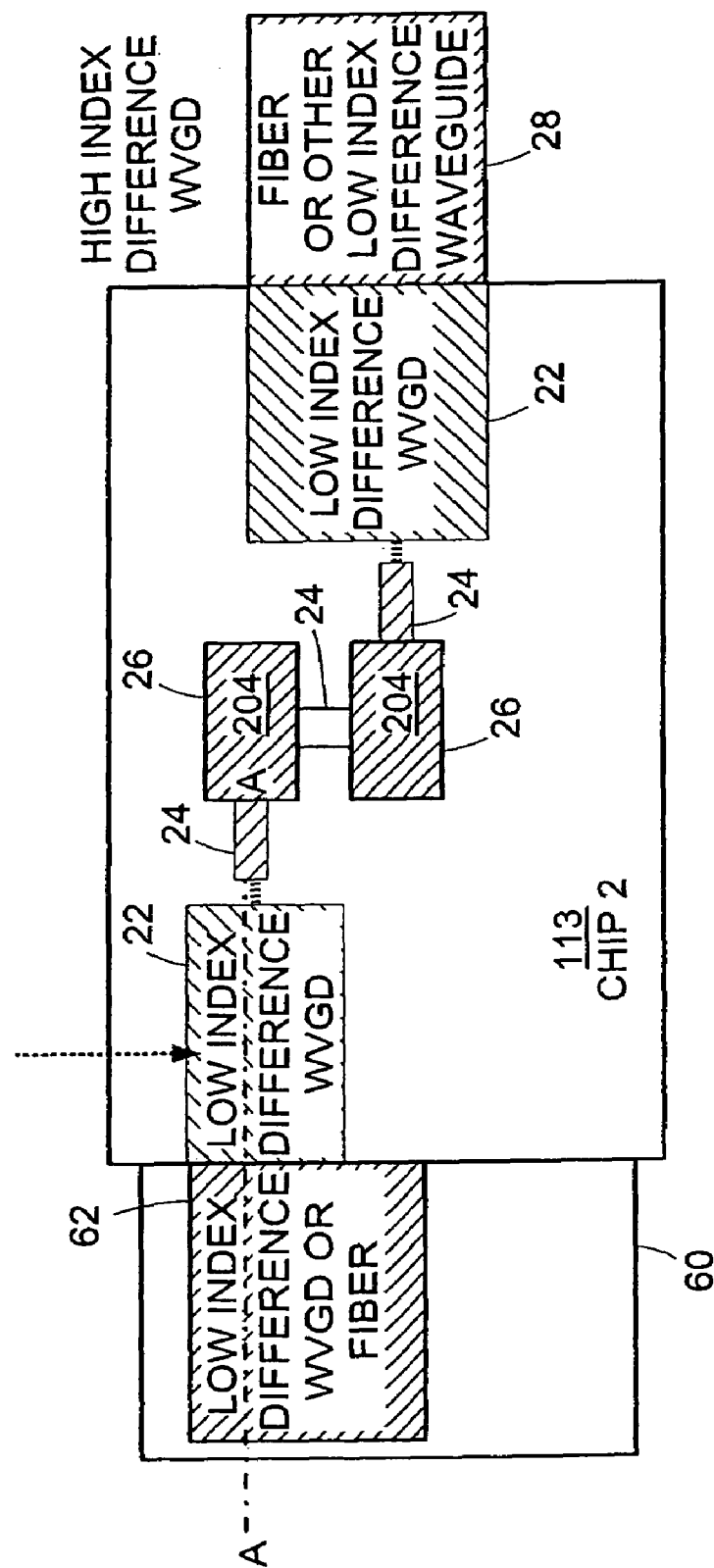
FIG. 4 is a block diagram of two optical chips according to a second embodiment of the invention.

FIG. 4 depicts a second embodiment of an optical chip in accordance with the invention. The embodiment of FIG. 4 is similar to that of FIG. 2, except that an optical connection is made between one of the low index difference waveguides 22 on the substrate 20 and an external chip 60 (the left side of FIG. 4) rather than an external optical fiber. FIG. 4 does, however, show a second optical connection made between a low index difference waveguide 22 on the substrate 20 and an external optical fiber 28 (the right side of FIG. 4). In FIG. 2, both low index difference waveguides 22 are connected to external optical fibers 28. Thus, FIG. 4 illustrates the possibility that optical signals can be transferred directly between low index difference waveguides on separate optical chips. The low index difference waveguide 22 on substrate 20 can therefore directly connect to external chips 60 as well as to external optical fibers 28. In addition, as specifically shown in FIG. 4, a low index difference waveguide 62 on an external chip 60 can be used to couple with the low index difference waveguide 22 on the substrate 20.

Figure 5:
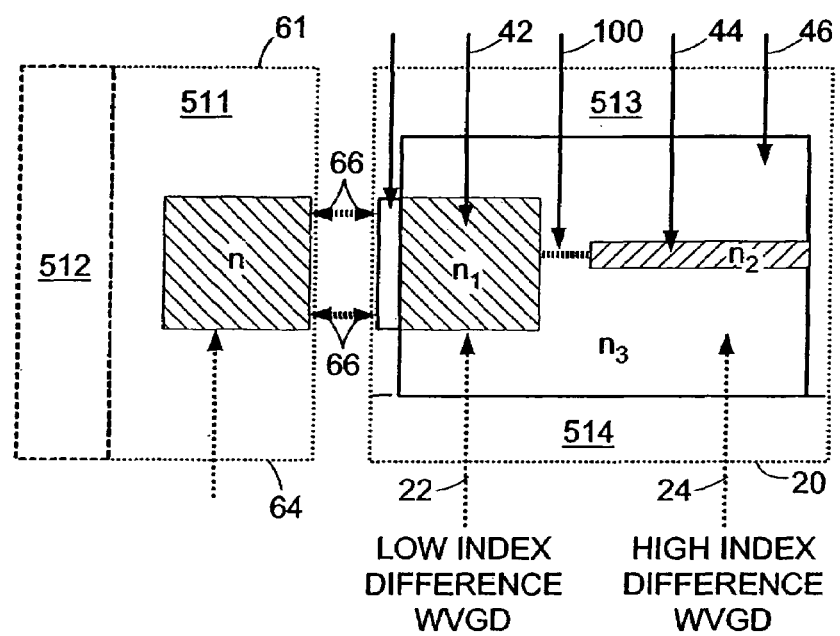
FIG. 5 is an enlarged cross-sectional view of a portion of the optical chip of FIG. 4 according to an embodiment of the invention.

FIG. 5 depicts an enlarged cross-sectional view of another embodiment in accordance with the invention. In the embodiment of FIG. 5, at least one emitting/receiving function 64 is fabricated on a second substrate 61 and is optically connected to the low index difference waveguide 22 on substrate 20. In this embodiment, the substrate 20 is similar to the embodiments described above. The substrate 20 therefore contains at least one low index difference waveguide 22 coupled to at least one high index difference waveguide 24, as well as an optical function (not shown in FIG. 5) optically connected to the high index difference waveguide 24. The emitting/receiving function 64 of FIG. 5 can be any of a variety of devices. For example, the emitting/receiving function 64 can be an edge emitting/receiving device or a vertically emitting/receiving device. Specific examples include surface-emitting LEDs, edge-emitting LEDs, and surface-emitting laser diodes. Surface-emitting/receiving optical functions are generally easier to fabricate than edge emitting/receiving functions, and some surface-emitting functions, such as surface-emitting LEDs, are more efficient than edge-emitting LEDs.

In the embodiment shown in FIG. 5, coupling between the low index difference waveguide 22 and the emitting/receiving function 64 is most efficient if the mode sizes of the waveguide 22 and the emitting/receiving function 64 are the same or are similar. The low index difference waveguide 22, therefore, can be designed to produce a mode size similar to that of the emitting/receiving function 64. It may, however, be difficult or impossible to effectively match the effective index of the emitting/receiving function 64 with that of the low index difference waveguide 22. For this reason, an anti-reflection coating 66 can be applied to an edge of the low index difference waveguide 22 on substrate 20 or on the emitting/receiving function 64 to suppress unwanted reflections and to aid in coupling efficiency. If, for example, the emitting/receiving function 64 on substrate 61 is a surface-emitting LED, an anti-reflection coating 66 can be applied to an edge of the low index difference waveguide 22 on substrate 20 or on the emitting/receiving function 64. Similarly, if the emitting/receiving function 64 on substrate 61 is a receiver, an anti-reflection coating 66 can be applied to this receiver or on the low index difference waveguide 22.

The embodiment of FIG. 5 shows that two or more optical chips can be optically connected through the use of the low index difference waveguide 22 on substrate 20. Substrate 20 contains high index difference waveguides 24 and optical functions 26, and yet external functions on separate optical chips with mode sizes similar to the low index difference waveguide 22 can be optically connected to the substrate 20 through low index difference waveguide 22. In still other embodiments, two or more optical chips, such as those shown in FIGS. 2–5, can be optically coupled. For instance, a first optical chip can contain a low index difference waveguide 22 coupled to a high index difference waveguide 24, which is in turn coupled to an optical function 26. A second optical chip can have a similar layout. These two optical chips can then be optically connected through the low index difference waveguides 22.

The optical chips described above can also be part of a larger subsystem. For instance, such a subsystem could include one of the optical chips described above connected to an external large mode field size dielectric waveguide. The optical chip in such an embodiment could include a low minimum bending radius waveguide, an optical function connected to the low minimum bending radius waveguide, and a large mode field size waveguide coupled to the low minimum bending radius waveguide. The external large mode field size dielectric waveguide, in this embodiment, would be external to the optical chip and would be optically coupled to the large mode field size waveguide on the optical chip. Such a subsystem including an optical chip and an external large mode field size dielectric waveguide, one example of which can be a module, could be used in a number of applications, including those described below.

The optical chips described above can be used for a variety of applications, including passive or active applications. In one embodiment, the optical chips described above can be used for communications applications. As an example, a splitter can be fabricated to split a single optical signal into 8 or 16 or 32 signals in a small area. Typical splitters are made using series of 1-by-2 splitters to perform splitting functions. For example, fifteen 1-by-2 splitters would be needed to split a single signal into 16 signals. If low index difference waveguides are used, this splitting function would require a large footprint. An optical chip having high index difference waveguides, such as those described above, could perform this splitting function in a significantly smaller footprint.

Another communications application can be in multiplexing or demultiplexing. As an example, a wavelength division multiplexing (WDM) function can be implemented as an optical function 26 on substrate 20. Such a WDM function can include combining or filtering out different wavelengths of light, which represent different channels of information signals. An optical chip having low minimum bending radius or high index difference waveguides can perform such functions in a small footprint.

The optical chips can also be used in Ethernet applications to increase the speed and bandwidth of such systems through optical applications. The optical chips can, for instance, be used to perform optical functions to help make an Ethernet into an optical system with 10 gigabit per second performance. The optical chips can also enhance Ethernet applications by decreasing the space needed to perform optical functions.

The optical chips described above can also be used to enhance computing and microprocessing functions in optical or electro-optical circuits. These devices can include optical and electronic functions on a single chip, and can include digital or analog signal processing applications. As an example, an optical clock for synchronizing signals and modulating these signals can be fabricated on the optical chip.

Sensing applications can also be performed. As an example, an optical chip can be fabricated with high index difference waveguides, and changes in characteristics of the optical waveguide mode itself can be used to detect the presence of certain chemicals or changes in temperature. In short, the optical chips described above having low minimum bending radius or high index difference waveguides can be used in a variety of applications.

Further, the optical chip can contain functions that change the information carrier from an optical signal to a signal in an alternative form of energy, or vice versa. Examples of alternate forms of energy that carry information include acoustic (sound/audio), radio frequency, infrared, and microwave, as well as other bands of the electromagnetic spectrum. This function will allow the optical chip to interface fiber optic and generic light-wave communications methods with wireless communications with carrier frequencies ranging from kHz to tens of THz.

The optical chips can incorporate other popular current technology, such as MEMS, lasers, detectors, micro-resonators, interference devices, multi-mode interferometers, arrayed waveguide gratings, and Mach-Zehnder modulators as basic building blocks of functionality. Together with other devices, subsystems on a single optical chip, including both passive and action applications, can be implemented.

As described above, the substrate 20 contains at least one large mode size waveguide 22 coupled to at least one low minimum bending radius waveguide 24. Two waveguides are "coupled" or "optically connected" if a change in one or more of the properties of an optical signal in one waveguide affects the properties of the optical signal in the second waveguide without an intermediate conversion to an electrical signal. Many optical couplers can be used in accordance with the invention. One such optical coupler is described in U.S. Pat. No. 6,253,015 to Ukrainczyk et al.

Generally, it can be desirable to have the lowest possible loss in optical signal in the coupler between a first waveguide and a second waveguide. This coupling loss, for instance, can be about 1 decibel or less for an efficient coupler. For coupling of waveguides having similar mode sizes and refractive indices, simple coupling methods, such as abutting an end of one waveguide to an end of the other waveguide, can be used. When the mode sizes of waveguides differ, however, more complex couplers can be used.

Figure 6:
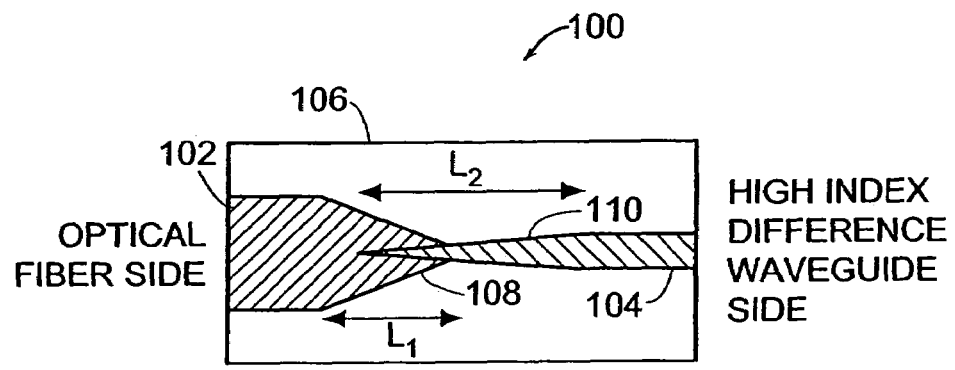
FIG. 6 is top view of a schematic diagram of an exemplary embodiment of a mode transformer according to one aspect of the invention.
Figure 7:
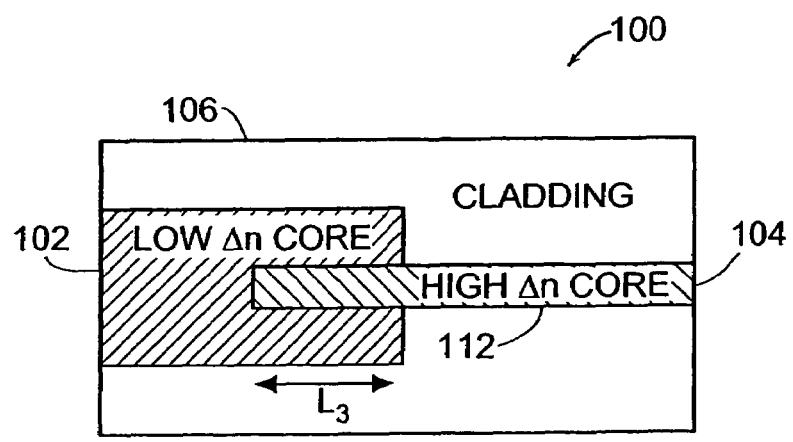
FIG. 7 is a side view of the mode transformer of FIG. 6.

FIGS. 6–10 are simplified schematic diagrams of an exemplary embodiment of a mode transformer or coupler 100 that can be used in accordance with the invention. Such a mode transformer or coupler 100 can be used as the coupler 100 on substrate 20 (FIGS. 2–5) to optically couple the large mode size waveguide 22 to the low minimum bending radius waveguide 24, although such a coupler can be used for other coupling applications as well. In the embodiments of the coupler or mode transformer 100 described below, the large mode size waveguide 22 is a low index difference waveguide, and the low minimum bending radius waveguide 24 is a high index difference waveguide 24, although, as mentioned above, other low minimum bending radius waveguides or large mode size waveguides can be used in other embodiments. FIG. 6 shows a top view of the mode transformer 100, while FIG. 7 shows a side view of the same transformer 100.

Figure 9:
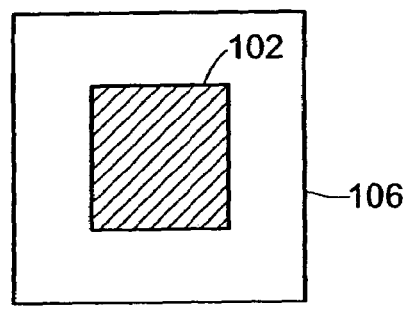
FIG. 9 is a cross-sectional view of the mode transformer in the low index core on the left side of FIGS. 6 and 7.
Figure 10:
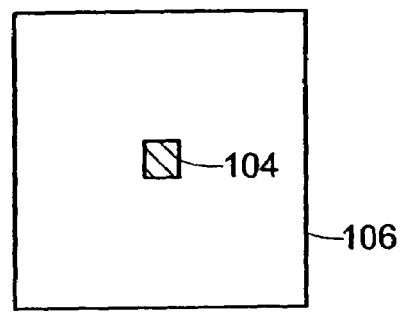
FIG. 10 is a cross-sectional view of the mode transformer in the high index core on the right side of FIGS. 6 and 7.

The mode transformer 100 includes a core material 102 of a low index difference waveguide (the left side of FIG. 6), a core material 104 of a high index difference waveguide (the right side of FIG. 6), and cladding material 106 surrounding both core materials 102, 104. The core material 104 and cladding material 106 on the left side define the low index difference waveguide, which forms a large mode, and the core material 102 and cladding material 106 on the right side define the high index difference waveguide, which forms a small mode. In one embodiment, both high and low index difference waveguides are channel waveguides. A channel waveguide is a waveguide having a core material surrounded on its sides by one or more cladding materials that have lower indices of refraction than that the core material. The cross-sectional shape of the core material in such a channel waveguide can be rectangular, square, elliptical, or circular. In other embodiments, the cross-sectional shape of the core material can be arbitrary. The mode field distribution of light resides primarily within the core material of a channel waveguide. It is within this core material of a typical channel waveguide that the peak optical intensity of light typically resides. The cross-sections of the mode transformer 100 shown in FIGS. 9 and 10 depict square core material shapes in the channel waveguides. FIG. 9 is a cross-sectional view of the left side of FIG. 6 in the low index core 102, and FIG. 10 is a cross-sectional view of the right side of FIG. 6 in the high index core 104.

Figure 8:
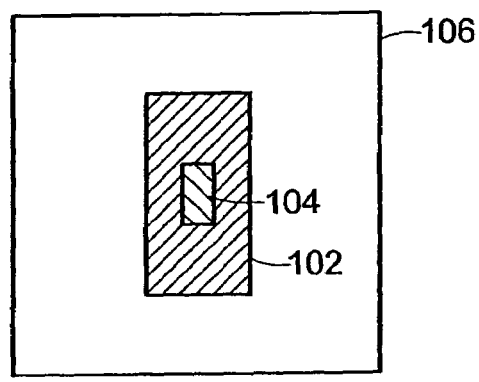
FIG. 8 is a cross-sectional view of the mode transformer of FIGS. 6 and 7 in the embedded portion 112.

A tapered region 108 of length $L_1$ on core material 102 is provided at one end of the low index difference waveguide. This taper 108, shown in FIG. 6, decreases in width as one moves toward the untapered portion of core material 104 (that is, from left to right in FIG. 6). A tapered region 110 of length $L_2$ on core material 104 is provided at one end of the high index difference waveguide. This taper 110 decreases in width as one moves toward the untapered portion of core material 102 (that is, from right to left in FIG. 6). These tapered regions 108, 110 are configured to intertwine so that a portion 112 of length $L_3$ of the tapered region 110 is embedded within the tapered region 108. FIG. 7 is a side view of mode transformer 100 that shows the portion 112 of length $L_3$. In the embodiment depicted in FIGS. 6 and 7, the tapered regions 108, 110 are tapered only in the horizontal direction. In the top view of FIG. 6, for instance, the widths (that is, from top to bottom as viewed) of tapered regions 108, 110 vary with lateral distance (that is, from left to right as viewed). The side view of FIG. 7, therefore, shows that the cores 102, 104 are not tapered in the vertical direction (that is, from top to bottom as viewed). FIG. 7 shows, however, that the vertical width of core material 102 is greater than the vertical width of core material 104. The portion 112 of core material 104 of length $L_3$ that is embedded in core material 102 is therefore surrounded on all sides by core material 102. FIG. 8, which is a cross-section of FIG. 7 in the portion 112 of length $L_3$, shows that the tapered portion 110 of core material 104 is surrounded on all sides by the tapered portion 108 of core material 102.

Although FIGS. 6 and 7 show tapers 108, 110 in only the horizontal direction, in other embodiments of the mode transformer 100 the tapers 108, 110 can be tapered in the vertical direction as well, e.g., pyramidal or cone-like in shape. In such embodiments, the taper 108 of the high index core 104 would form a point within the embedded portion 112, and the taper 110 of the low index core 110 would also be tapered in the vertical direction. The side view of FIG. 2 could therefore look more similar to the view of FIG. 6 in such an embodiment. In other embodiments, each taper 108, 110 can have a tip that is not pointed, but instead has a discernable width that is smaller than the respective core material 102, 104, i.e., it is blunted or rounded. In other embodiments, multiple tapers 108, 110, or "fingers," can protrude from cores 102, 104, rather than a single taper 108 on core 102 and a single taper 110 on core 104. These fingers can intertwine to cause a gradual change in effective index and mode similar to that caused by the dual tapers 108, 110 of FIGS. 6 and 7. In still other embodiments, the cross-sectional shape of the high index core material 104 and low index core material 102 can be modified to match the shape of external optical fiber on the low index side of the transformer 100 and to match the shape of the high index waveguide used for optical functions on the high index side of the transformer 100.

The index of refraction $n_2$ of the core material 104 is larger than the index of refraction $n_1$ of the core material 102, which is, in turn, larger than the index of refraction $n_3$ of the cladding material 106. In the illustrated exemplary embodiment, $n_1$ is slightly larger than $n_3$. The low index difference waveguide defined by the core material 102 and cladding material 106 (seen in cross-section in FIG. 9) has a small index difference Δn, since $n_1$ is only slightly larger than $n_3$:

$$0 < \frac{n_1 - n_3}{n_3} < 0.1.$$

On the other hand, the high index difference waveguide defined by the core material 104 and cladding material 106 (seen in cross-section in FIG. 10) has a larger index difference Δn, since $n_2$ is much larger than $n_3$:

$$0.1 \le \frac{n_2 - n_3}{n_3}.$$

FIG. 9 shows a cross-sectional view of the mode transformer 100 of FIGS. 6 and 7 in the untapered portion of core material 102. The mode field size of an input optical fiber or low index difference waveguide has a cross-sectional dimension similar to that shown in FIG. 9. Such an input optical fiber can be coupled to the left side of the mode transformer 100 as shown in FIGS. 6 and 2 when the mode transformer 100 is used to couple optical fiber to a high index difference waveguide. When used in the optical chip of FIG. 2, the low index difference waveguide 22 can be coupled to the left side of the mode transformer 100. FIG. 10 shows a cross-sectional view of the mode transformer 100 in the untapered portion of core material 104. The mode field size of a high index difference waveguide that can be coupled to the right side of mode transformer 100 has a cross-sectional dimension similar to that shown in FIG. 10. When used in the optical chip of FIG. 2, the high index difference waveguide 24 can be coupled to the right side of the mode transformer 100.

In operation, the mode of propagating lightwaves traveling from left to right in the mode transformer 100 as shown in FIG. 6 will be transformed from the mode of the low index difference waveguide, whose core/cladding indices are $n_1/n_3$, to the mode of the high index difference waveguide, whose core/cladding indices are $n_2/n_3$.

The mode entering the mode transformer 100 on the left side of FIG. 6 is defined by the low index difference waveguide cross-section shown in FIG. 9. In one embodiment, such as that shown in FIG. 9, this mode is that defined by a low index difference channel waveguide. The optical mode is guided by the low index difference waveguide, preserving the mode characteristics of the low index difference waveguide until the taper 110 of the high index core 104 is introduced into the low index core 102. In taper 110, the high index core 104 is horizontally tapered to gradually change the effective index of refraction from that of the low index difference waveguide to that of the high index difference waveguide. The "effective index" is an effective index of refraction, or average refractive index, calculated for the entire cross-section of a waveguide, which can include more than one distinct layer of material. Such an effective index determines the mode field of light in a waveguide. When the high index core 104 is narrow in taper 108, the effective index is close to the index of refraction $n_1$ of the low index core 102 (and the cladding 106). The mode properties at this point are therefore also similar to the mode properties of the low index difference waveguide. A large portion of the mode field distribution therefore exists outside of the high index core 104 at this point. As the high index core 104 is gradually widened, the effective index increases accordingly, approaching the index of refraction $n_2$ of the high index difference waveguide. The mode gradually transforms into a mode defined by the waveguide cross-section shown in FIG. 10 for the high index difference waveguide. As the effective index varies, therefore, the mode of propagating lightwaves varies accordingly. In one embodiment, the mode for the cross-section of FIG. 10 is that defined by a high index difference channel waveguide.

The core material 102 is tapered in the opposite direction from the core material 104, as seen in FIG. 6. This taper 108 terminates the low index difference waveguide once the mode is coupled into the high index difference waveguide. This taper 108 also enhances the efficiency of the mode transformation by optimizing the focusing and reflection of the mode. Taper 108, for instance, assists in focussing light into the high index core material 104 by reflecting light toward core 104. Because the core 102 of the low index difference waveguide is large and the index difference $\Delta n$ between the core 102 and the cladding 106 is small, the focussing effect of the taper 108 dominates over the change in mode size at this point in the waveguide. Before the point where the taper 110 of the high index core 104 is introduced into the taper 108, for instance, the taper 108 causes the effective index to decrease slightly, which could increase the mode size. This slight decrease in the effective index, however, is dominated by the focussing effect of the taper 108. The taper 108 therefore focuses light into the high index core 104, which increases the efficiency of the transformer 100. The shape of taper 108 inherently reduces the back-reflection.

The tapered region 108 of the low index difference waveguide and tapered region 110 of the high index difference waveguide provide an efficient, bi-directional mode transformer 100. The taper 110 of the high index difference waveguide terminates the high index difference waveguide once the mode is coupled into that of the low index difference waveguide, and vice versa. The mode transformer 100 works for light traveling from right to left as well as from left to right as shown in FIGS. 6 and 7, making it a bidirectional mode transformer.

The taper length $L_2$ of the high index core 104 can be designed to minimize mode transformation loss. In other words, this length $L_2$ is designed to slowly change the mode (and the effective index) from that of the low index difference waveguide to that of the high index difference waveguide. The design of the taper 108 of the low index core 102 can be designed to minimize reflection, maximize focusing, and maximize efficiency. The taper 108 of the low index core 102 can, for instance, assist in focussing light into the mode of the high index difference waveguide. The embedded portion 112 of the tapered regions 108, 110, can also be chosen to maximize coupling efficiency.

The mode transformer 100 is useful for coupling the mode from an optical fiber to a high index difference waveguide. The optical fiber can be coupled on the left side of the transformer 100 as shown in FIG. 6. The cross-section of typical optical fiber can have a profile similar to the cross-sectional view of the left side of the transformer 100 shown in FIG. 9. The index difference $\Delta n$ between the core material 102 and cladding material 106 can be chosen to be similar to that of fiber (~0.01). The core/cladding indices $n_1$, $n_3$ and thus the mode are similar to that of optical fiber, resulting in a highly efficient coupling to such optical fiber. Once the mode is coupled with optical fiber, the mode will be transformed by transformer 100 into the mode of a high index difference waveguide as described above.

This coupling technology can be applied to any system coupling a low index difference waveguide to a high index difference waveguide. One can use $SiO_2$ as the cladding material 106, $SiO_xN_y$ as the low index difference waveguide core material 102, and $Si_3N_4$ as the high index difference waveguide core material 104. These materials can vary in different embodiments. For the illustrated exemplary embodiment, the low index core 102 has a 10 µm by 10 µm square dimension, the high index core has a 1 µm by 1 µm square dimension, $L_1=L_2=50$ µm, and $L_3=40$ µm. In addition, the tapers 108, 110 are linear tapers. These dimensions can vary in other embodiments. This design produces a simulated value of 75 percent efficiency at a light wavelength of 1.55 µm. This is an improvement of over 30 percent efficiency over the case of butt-coupling a low index core to a high index core without a dual-taper. The transformer 100 is also a bidirectional transformer, which shows similar efficiencies for mode transformation in both directions.

The embodiment of the transformer 100 described above can be made in a variety of ways. For example, the transformer 100 can be formed by lithographic techniques. Such a process can involve depositing a layer of material and then etching away portions of that material that are not desired. This process of depositing material and etching away undesired portions can be repeated until the transformer 100 is formed. Tapered edges can be formed through patterning a layer of material through the use of a mask. After deposition of a layer of material, portions of the material can be irradiated through the mask so that the tapered portions are etched into desired shapes. To form the embedded portion 112 (FIG. 7) of the high index core 104 within the low index core 102, a layer of $Si_3N_4$ as high index core 104 can be deposited and etched to form the taper 110, and then subsequent layers of $SiO_xN_y$ as low index core 102 can be deposited and etched around the taper 110 to form the taper 108 in the low index core 102. $SiO_2$ for cladding material 106 can be deposited in appropriate layers to complete the fabrication of the transformer 100.

The fabrication method described above involves a number of deposition and etching steps to form different portions of the taper 108 in the low index core 102 and to form the taper 110 in the high index core 104. In another fabrication method, the high index core material 104 can be deposited and etched to form the taper 110, and then a layer of low index photosensitive material can be deposited around the taper 110, followed by deposition of the cladding material. The low index photosensitive material can be selected so that the index of refraction of this material, before being altered through exposure to light, matches the index of refraction of the material used for the cladding region. A mask can then be fabricated to cover portions of the low index photosensitive material that are to keep the same index of refraction as the cladding material, and thus become part of the cladding regions. The index of refraction changes for portions of the low index photosensitive material that are not covered by the mask and are instead exposed to light. These portions of the low index photosensitive material therefore become the low index core 102, including the tapered portion 108 of the low index core 102 when the mask is appropriately shaped. Such a fabrication technique reduces the number of deposition and etching steps that are necessary to form the transformer 100. A low index photosensitive material that reduces or increases its refractive index when exposed to energy can also be used. In this case, the portion of the layer that becomes cladding can be masked either positively or negatively to create the appropriate structure.

While exemplary embodiments of the transformer 100 have been illustrated with continuous or linear (flat edged) tapers, it will be appreciated that segmented or non-linear tapers can also be utilized in accordance with the invention. For example, the tapers can have stepped tapered edges, or a concave or convex shaped tapered edges.

Figure 11A:
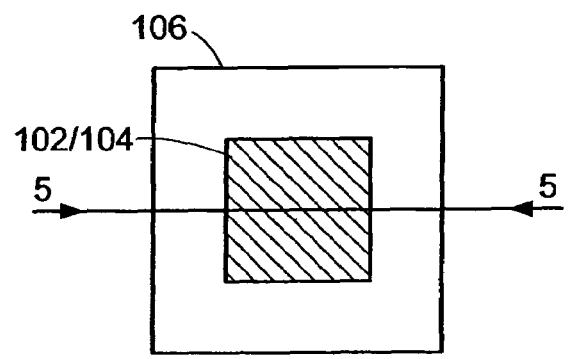
FIG. 11A is a cross-sectional view of the mode transformer of FIGS. 6 and 7.
Figure 11B:
FIGS. 11B–11I are graphs of exemplary refractive index profiles along line 5—5 of FIG. 11A.
Figure 11C:
Figure 11D:
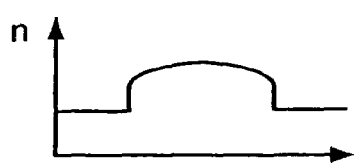
Figure 11E:
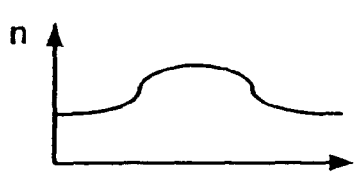
Figure 11F:
Figure 11G:
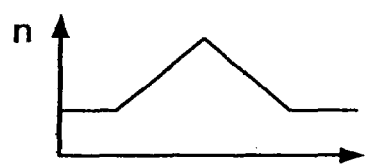
Figure 11H:
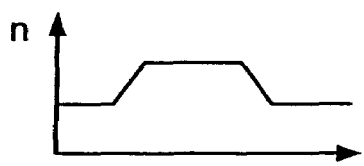
Figure 11I:
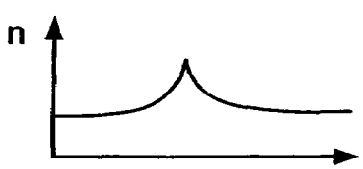

FIG. 11A is a cross-sectional view of the waveguide of either FIG. 9 or 10. FIGS. 11B–11I are some possible index profiles along line 5—5 in FIG. 11A. These index profiles show the index of refraction change with horizontal or vertical direction change, and these index profiles can be for the interface between a low index core and cladding material or between a high index core and cladding material. While exemplary embodiments have been illustrated with step index profiles between the core material and the cladding material for both the low and high index difference waveguides shown in FIGS. 11A and 11B, it will be appreciated that other index profiles between the core and the cladding can also be utilized.

For example, various other index profiles such as graded index and step graded index profiles can be used as long as the refractive index of the core material is higher than the refractive index of the cladding material on average. Such profiles are shown in FIGS. 11C–11I. The various index profiles in FIGS. 11B–11I are illustrated along the horizontal (or vertical) direction for purposes of illustration, but can also be applied in other directions.

Figure 12:
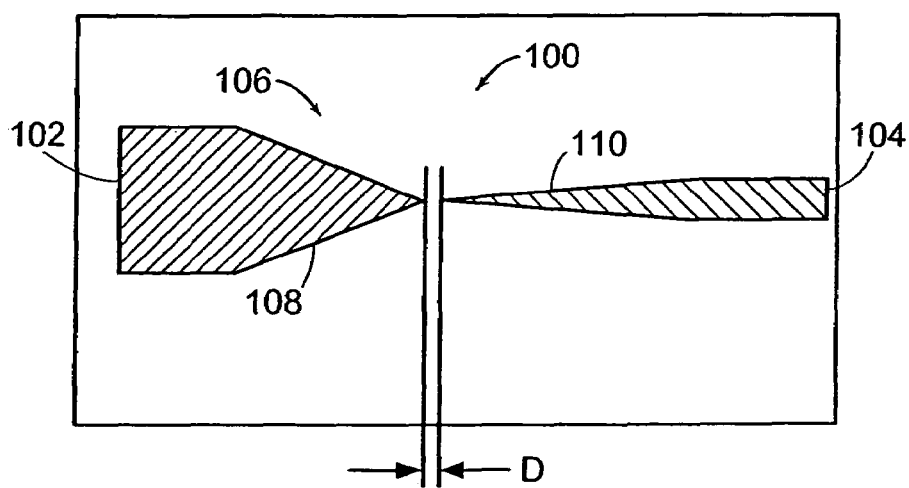
FIG. 12 is a top view of a schematic diagram of an exemplary mode transformer in which the taper tips are optically in contact, but are not in physical contact.

While exemplary embodiments of the transformer 100 have been illustrated with the second taper 110 embedded in the first taper 108, it will be appreciated that two tapers whose tips are optically in contact can also be utilized. In such an embodiment, one of the cores is not embedded within the other core. Instead, the tips of each taper can be physically in contact or, in other embodiments, the tips can be physically separated, but remain optically in contact. An example of two tapers 108, 110 whose tips are considered to be optically in contact is shown in FIG. 12. When the distance D between the tips of the two tapers 108, 110 shown in FIG. 12 is short enough to allow for appreciable transmission efficiency, the tapers 108, 110 are considered to be optically in contact, even though the tapers have no overlapping sections or embedded portions, and even though the tips of the tapers 108, 110 are physically separated. In exemplary embodiments, D is less than or equal to $3\lambda$, where $\lambda$ is the wavelength of light propagating along the waveguide. Appreciable transmission efficiency is defined as efficiency higher than or equal to 1–10 percent.

While exemplary embodiments of the transformer 100 have been illustrated with two channel waveguides, it will be appreciated that other waveguide configurations can be used as long as the mode-field sizes in cross-sectional area are similar to those in the channel waveguides used in the illustrated embodiments.

High index difference waveguides, such as those having an index difference $\Delta n$ of at least 0.1 that are used in the transformer 100 and optical chips described above, can cause large scattering losses for propagating light. Light striking the interface between core material and cladding material can be scattered due to imperfections or roughness at the interface. Thus, edges with rough interfaces can be prone to cause scattering losses. High index difference waveguides typically have a smaller core diameter than low index difference waveguides. Light therefore strikes the interface between the core material and the cladding material with greater frequency for high index difference waveguides than for low index difference waveguides, resulting in greater scattering losses. In addition, scattering losses increase as the index difference between the core material and the cladding material increases.

The high index difference waveguides used on substrate 20, within transformer 100, and within optical chips described herein can be created to reduce or suppress sidewall scattering losses.

Figure 13:
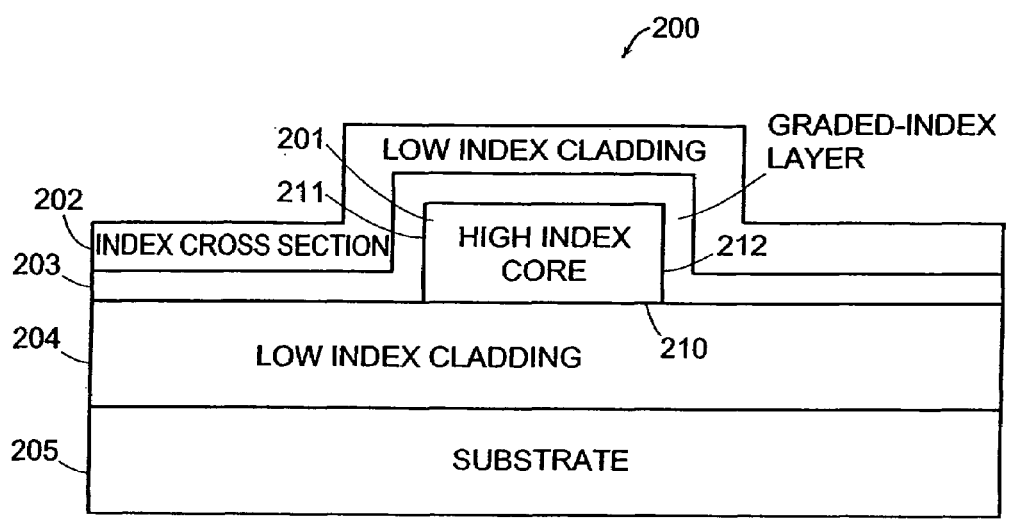
FIG. 13 is a cross-sectional view of an exemplary embodiment of a graded index planar waveguide in accordance with an aspect of the invention.

In one embodiment, a separate graded index region can be applied over a high index core material and between the high index core material and cladding material to decrease scattering losses. FIG. 13 is a cross-sectional view of an exemplary embodiment of a graded index planar waveguide 200. Such a waveguide 200 can be a low minimum bending radius waveguide used on an optical chip or a transformer 100 as described above. One example of such a low minimum bending radius waveguide, which is shown in FIG. 13, is a high index difference waveguide. The waveguide 200 of FIG. 13 includes a substrate 205 for mechanical support (this can be substrate 20 of FIGS. 2–5), a first low index cladding 204, a high index core 201, a graded index region 203, and a second low index cladding 202. The refractive index $n_1$ of the core 201 is larger than the refractive indices $n_2$, $n_4$ of the cladding regions 202, 204. Cladding region 202 can, in one embodiment, be made from the same material as cladding region 204. In other embodiments, these cladding regions 202, 204 can be made from different materials and can have different indices of refraction. The graded index region 203 is a separate, unique region between the core 201 and the cladding 202. The index of refraction of the graded index region 203 gradually varies from that of the high index core 201 to that of the low index cladding 202, 204. Scattering of light due to the rough interfaces between the core 201 and the cladding 202 is minimized because the index change from core 201 to cladding 202 is gradual due to the graded index region 203.

FIG. 13 depicts a layer of the graded index region 203 deposited over the high index core 201 on three sides. A fourth side 210 of the high index core 201 is not covered by the graded index region 203. An additional graded index region can, however, be applied between the core 201 and the cladding 204 on side 210 if the interface between the core 201 and the cladding 204 is rough. This layer will also make the waveguide look more symmetric, reducing polarization dispersion.

In other embodiments, the graded index region 203 can be applied to one, two, or all sides of the high index core 201. In still other embodiments, the high index core 201 can have a different cross-section than the rectangular cross-section shown in FIG. 13. In such embodiments, the graded index region 203 can be applied to a portion of the edge of the high index core 201 or all around the high index core 201. Generally, portions of the edges of the high index core 201 are rough from the fabrication methods used to create the high index core 201. It can be desirable, in some embodiments, to apply the graded index region 203 to these rough edges. Rough edges cause greater scattering losses than smooth edges, so it can, in some embodiments, be less important to apply the graded index region 203 to the smooth edges.

For the embodiment shown in FIG. 13, the side edges 212, 214 of the high index core 201 can have rougher surfaces than the other edges due to the fabrication technique of the high index core. Etching processes, for example, can be used to form the side edges 212, 214, and these side edges 212, 214 can therefore be rough. In one embodiment, therefore, a graded index region 203 is applied to only these side edges 212, 214 of the high index core 201. In this embodiment, therefore, low index cladding 202 abuts the top of the high index core 201 (not shown in FIG. 13), low index cladding 204 abuts the bottom 210 of the high index core 201, and the graded index region 203 is between the high index core 201 and the low index cladding 202 on side edges 212, 214.

Figure 14:
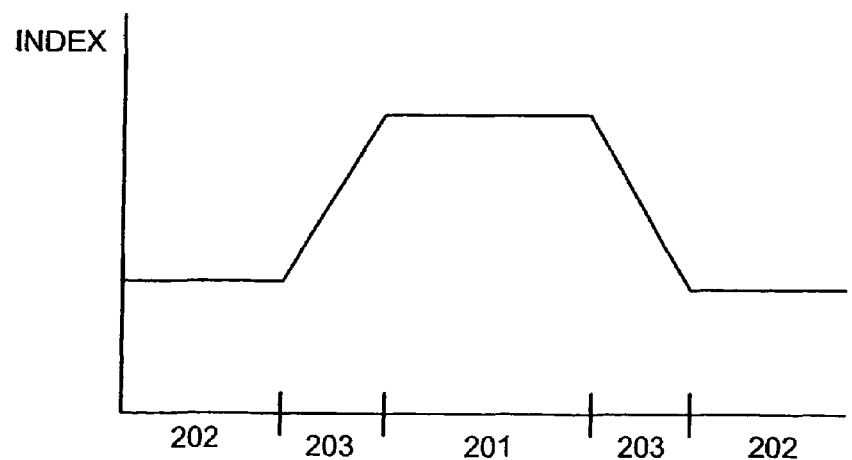
FIG. 14 is a graph of an exemplary refractive index profile along a cross-section of FIG. 13.

The index cross-section of the high index core 201, cladding 202, and the graded index region 203 for the embodiment of FIG. 13 is demonstrated in the graph of FIG. 14. The index profile of the graded index region need not be linear, as shown in FIG. 14. The refractive index in the high index core 201 is higher than that in the cladding 202. The refractive index in the graded index region 203 is graded so that there is a less abrupt jump in refractive index between the high index core 201 and cladding 202. The refractive index of the graded index region 203 can be changed between low and high refractive index regions using any index profiles such as curves and staircase steps. Any profile that reduces the index jump from core 201 to cladding 202 at the interface will lower the scattering loss. The graded index region 203 can be designed so that the loss is optimally minimized. At the same time, the design of the graded index region 203 can address the change in the confinement factor (that is, how tightly light is confined in the waveguide core 201) due to the presence of the graded index region 203. The graded index region 203 will play a role in waveguide performance, including in areas such as bends in the waveguide. The design of the graded index region 203 can also reduce modal and polarization dispersion.

Figure 15:
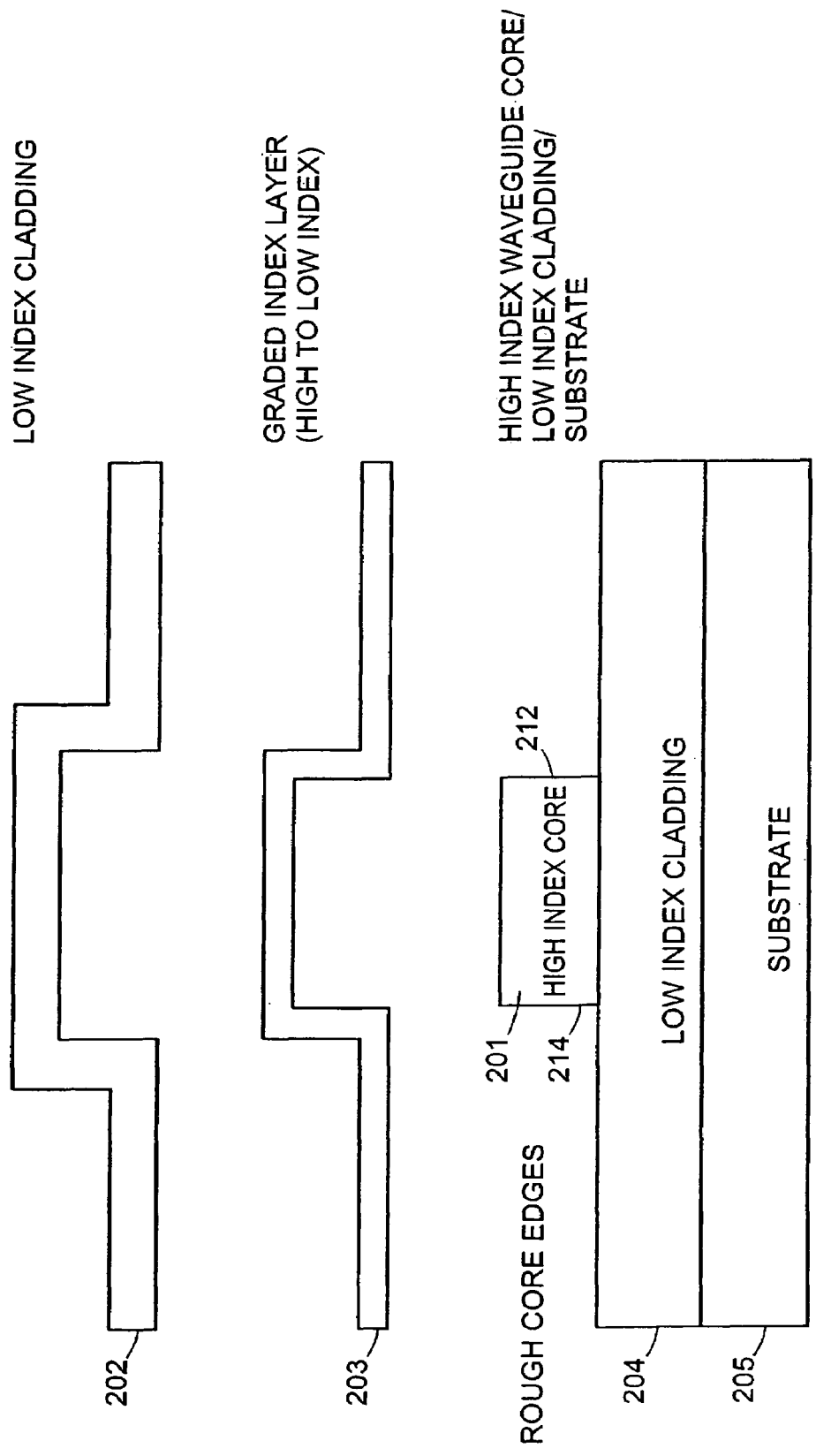
FIG. 15 is a diagram of the fabrication steps for the graded index waveguide of FIG. 13 using a thin film deposition technique.

FIG. 15 is a diagram of an exemplary fabrication process of a graded index waveguide in accordance with the invention. The low index cladding 204 is deposited with the high index core 201 deposited over the cladding 204. The patterned waveguide core 201 has rough edges 212, 214 arising from the patterning techniques used. Thereafter, the graded index region 203 is deposited over the core 201. During the deposition process, the index of the layer is varied from that of core 201 to that of cladding 202. The index grading can be achieved by varying the chemical composition of the layer. Finally, the cladding region 202 is deposited on top.

Such a gradient in the refractive index of the graded index region 203 can also be obtained by a thin film growth method. During the growth process, the composition of the impinging material at the waveguide core surface can be changed to obtain an index gradient.

Another method of making graded index region 203 in the waveguide is to obtain a gradient in the atomic composition at the surface of the waveguide core 201 from a chemical reaction. The composition of the waveguide core 201 can be altered by chemical reactions that yield products that are transparent to the wavelength of interest and that have an index lower than that of the core 201. Since the concentration of the reactant of the chemical reactions is highest at the surface and decreases exponentially due to the diffusion of the reactant into the core material, there will be a concentration gradient of the product into the core material starting from the surface. The index near the surface will be graded according to the chemical composition gradient.

A graded index silicon nitride waveguide is an example of this type of waveguide. As shown in FIG. 13, the graded index region 203 in this case is a silicon oxynitride layer whose refractive index varies from that of a silicon nitride core 201 to that of a silicon dioxide cladding 202. The index change is achieved by changing the ratio of oxygen and nitrogen in the silicon oxynitride layer. Deposition techniques such as chemical vapor deposition or sputtering can be used for depositing this layer.

A graded index germanium (Ge)/silicon (Si) waveguide is an example of a graded index waveguide obtained by a thin film growth technique. When germanium is the core material 201 and silicon is the cladding material 202, $Si_xGe_{1-x}$, can be the graded index region 203, and the refractive index of this graded index region 203 is graded during the growth process.

An example of obtaining a graded index region using a chemical reaction can be illustrated with a waveguide having a core 201 of silicon nitride and a cladding 202 of silicon dioxide. By subjecting the silicon nitride waveguide core 201 to oxidizing agents, a silicon oxynitride layer is formed at the surface. Since this process is controlled by diffusion of the oxidizing agents into the silicon nitride waveguide core 201, the concentration gradient of oxygen and nitrogen is created at the surface, with the surface having the highest level of oxygen. The concentration of oxygen decreases into the waveguide core while that of nitrogen increases. The graded index region 203 is therefore formed between the core 201 and the cladding 202.

In other embodiments of the invention, the rough surfaces of the waveguide are smoothed to reduce the root mean square (rms) roughness of the surface and thereby to reduce scattering losses. As noted above, waveguide patterning processes such as etching result in rough, uneven side edges. A low-loss waveguide is obtained by subjecting the patterned waveguide to treatments that smoothen the core/cladding interfaces, and/or change the waveguide core dimension. The method is particularly useful for low minimum bending radius waveguide systems where the scattering loss is high, in particular, where the waveguide will be bent to a small bending radius in the optical chip device. One example of such a low minimum bending radius waveguide is a high index difference waveguide. The method is useful for reducing scatter losses in single mode waveguides where the single mode cut-off dimension is less than about 2.5 times the wavelength in the core. In particular, the method can be used for waveguides having a mode size of less than 2 microns (μm).

In an exemplary embodiment, a method includes smoothing of the core/cladding interface of silicon-on-insulator (SOI)-based waveguides (Si/SiO$_2$) by oxidation of the core at high temperatures, after waveguide patterning. In other exemplary embodiments, a method includes wet chemical etching of the waveguide core after waveguide patterning. In still other exemplary embodiments, a method includes annealing the waveguide in a gaseous ambient including hydrogen after waveguide patterning.

Figure 16:
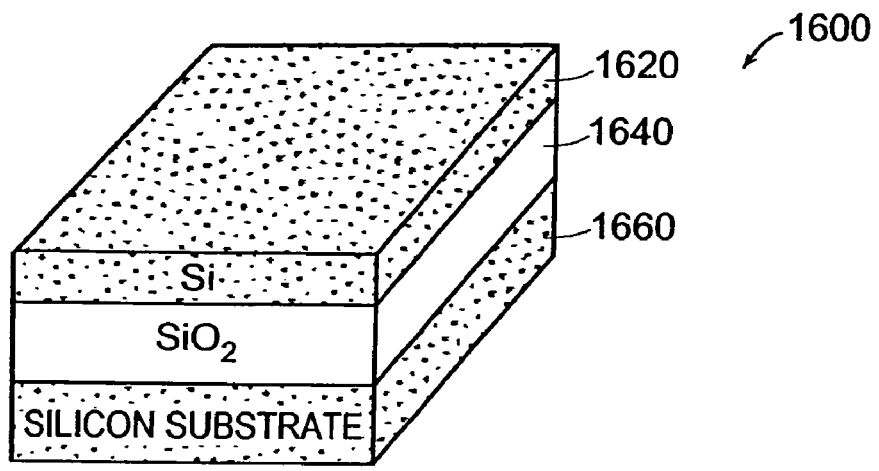
FIG. 16 is a perspective block diagram of an initial SOI platform 100 on which a waveguide is formed.

An exemplary embodiment of the invention provides an oxidation smoothing technique that reduces the roughness at the core/cladding interfaces of Si/SiO$_2$ (SOI) waveguide. FIG. 16 is a perspective block diagram of an initial SOI platform 1600 on which a silicon-containing waveguide is formed. In some embodiments, the waveguide is silicon or silicon nitride. A top silicon layer 1620 will be made into a waveguide core while a SiO$_2$ layer 1640 will become an under-cladding region. The substrate 1660 can be made of any material, such as silicon, indium phosphide, ceramic, or quartz, and is provided for mechanical support.

Figure 17:
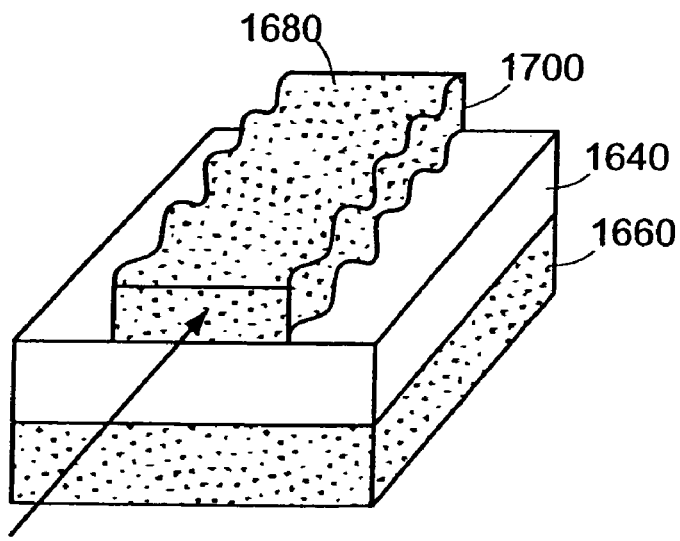
FIG. 17 is a perspective block diagram of the platform of FIG. 16 including a waveguide core after a typical patterning process.
Figure 18:
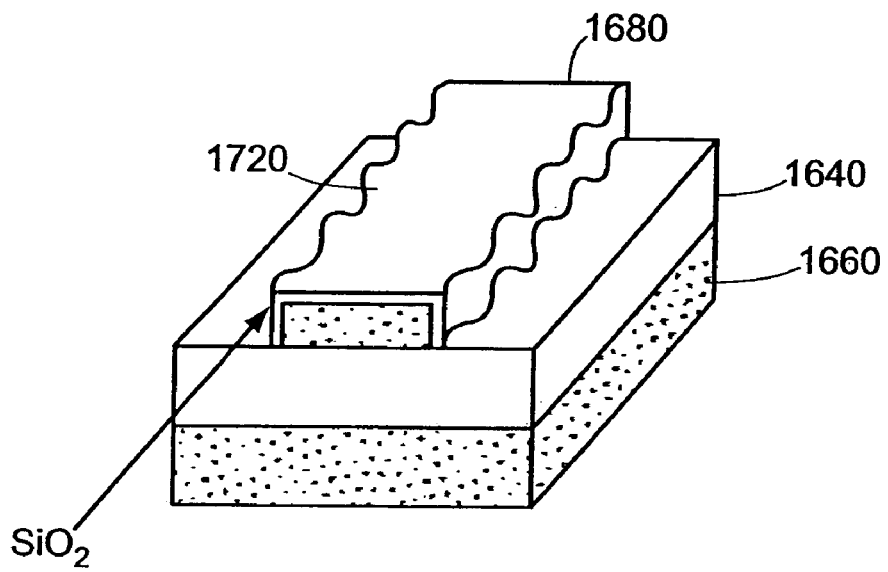
FIG. 18 is a perspective block diagram of the platform of FIG. 17 after the surfaces of the core have reacted with the oxidizing agents and form a coating layer of $SiO_2$.

FIG. 17 is a perspective block diagram of the platform including a waveguide core 1680 after a typical patterning process including photolithography and etching of the top silicon layer 1620 of FIG. 16. The sidewall roughness 1700 of the core 1680 is due to the waveguide patterning process. This roughness is responsible for scattering loss in the waveguide. The core 1680 is then subjected to oxidizing agents, such as O$_2$ or H$_2$O gases at an elevated temperature. The surfaces of the core will react with the oxidizing agents and form a coating layer of SiO$_2$ 1720, as shown in FIG. 18. Since convex points of the rough surface 1700 oxidize faster than concave points, the reaction tends to reduce the roughness of the core.

The reaction rate increases with the reaction temperature. When the reaction temperature is too low, oxidation does not proceed rapidly or extensively. When the reaction temperature is too high, one may not have a good control over the thickness of SiO$_2$ formed because of a high reaction rate. In order to grow nanometer (nm) to micron (μm) thick layers of SiO$_2$ in a period of minutes to hours, typical reaction temperature ranges between 600 to 1200° C. The oxidation time will depend on the oxidation temperature since the reaction rate depends on the temperature.

In some embodiments, the oxidation time is chosen to achieve a desired waveguide core dimension. Since formation of oxidation product results in the consumption of the silicon waveguide core, initial core dimensions are chosen taking this factor into consideration. Thus, initial core dimensions are those that provide both a core of the desired dimension after the oxidation reaction has consumed a portion of the core. In some embodiments, oxidation conditions are selected to form an oxidation product that just reacts away surface roughness. The resultant oxidation layer is then removed and a suitable cladding is applied. In other embodiments, oxidation conditions are selected to provide an oxide layer that can serve as a cladding or portion of the cladding region in the final device, in which case no post fabrication of the waveguide is required because the final waveguide dimensions are obtained during the oxidation process. In still other embodiments, additional cladding material is deposited on the oxidation layer. The cladding material can be the same as or different from the oxidation layer.

Figure 19:
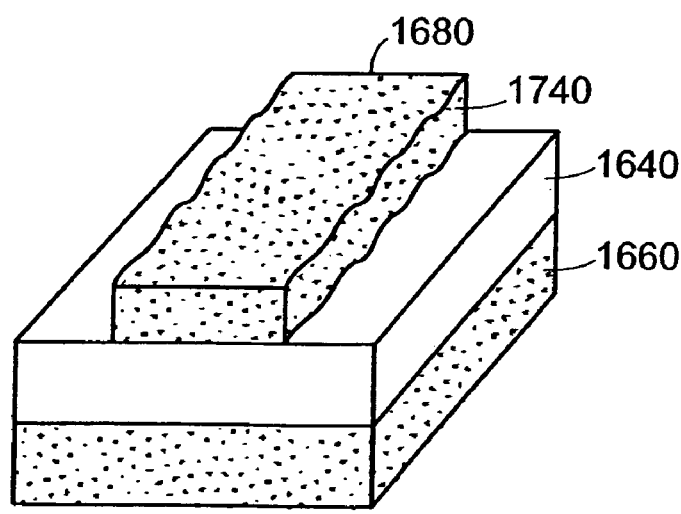
FIG. 19 is a perspective block diagram of the platform of FIG. 18 following the removal of the $SiO_2$ layer to show the silicon core surface after smoothing.

Exemplary cladding materials include SiO$_2$, air and vacuum, alumina, organic polymers, and variations of silica such as spin-on glass, boron-phosphorus-doped silica glass (BPSG), phosphorus-doped silica glass (PSG), boron-doped silica glass (BSG), silicon nitride and silicon oxynitride (SiO$_x$N$_y$). FIG. 19 is a perspective block diagram of the platform following the removal of the SiO$_2$ layer 1720 to show the silicon core surface 1740 after smoothing. The rms roughness value of the sidewalls can decrease several fold, e.g., by a factor of 2 to 5. Alternatively, one can choose not to remove the SiO$_2$ layer 1720 since it can act as a cladding layer for the waveguide core in FIG. 18.

Different oxidizing agents can be used to react with silicon to form SiO$_2$. Exemplary oxidizing agents include O$_2$, H$_2$/O$_2$, H$_2$O$_2$, ozone and the like. Suitable oxidizing agents are readily determined by the art skilled. The oxidation temperature and time should be chosen according to the chosen oxidant, since the reaction rate depends on the specific species of oxidants used.

The method of the invention can be used to smoothen the waveguide core surfaces of other geometries, such as ridge waveguides. Any SOI waveguide whose core is defined by a patterning process that produces surface roughness can be smoothened by this technique.

An experiment was carried out to demonstrate the oxidation smoothing of the waveguide sidewalls. To make Si/SiO$_2$ waveguides by oxidation smoothing, Ultrabond Si-on-insulator wafers with a 0.2 μm-thick top Si layer on 1 μm-thick SiO$_2$ were used. The wafers were patterned by photolithography and reactive ion etching (RIE) to obtain strip waveguides as shown in FIG. 17. For photolithography, a 10× stepper with a G-line UV lamp emitting at 436 nm was used. For RIE, SF$_6$ gas was used to etch the exposed Si. Straight waveguides of widths from 0.5 to 8 μm were made. The waveguide then was subjected to a wet oxidation step for 43 min with H$_2$O and O$_2$ at 1000° C. After the oxidation step, the dimensions of the smallest waveguide were about 0.5 μm in width and 0.05 μm in height. The fabrication steps are shown in FIGS. 17–19, in which the resulting SiO$_2$ layer was removed to reveal the core/cladding interface for atomic force microscopy (AFM) analysis. A blanket layer of 1 μm-thick SiO film was deposited by plasma-enhanced chemical-vapor deposition on the waveguides as an upper cladding layer for transmission loss determination.

The sidewalls of the waveguide fabricated by oxidation smoothing were viewed by AFM. The vertical roughness was distinctly different from that of the conventionally fabricated waveguide, which has an rms roughness of 10 nm and an autocorrelation length of 50 nm. In contrast, the rms sidewall roughness value for the oxidation smoothed sample was 2 nm for the same autocorrelation length. The oxidation reaction smoothens the roughness developed during the waveguide-patterning process (photolithography and RIE), since the convex points of the rough Si surface react faster than the concave points. The uneven reaction rates lead to a smooth Si surface, which is a lower surface-energy state.

During the experiment, the waveguide thickness decreased due to the consumption of silicon to form $SiO_2$. The reduction in thickness resulted in the reduction of the effective refractive index of the core, and thus in the reduction of the effective refractive index difference between the core and the cladding. The reduction in the effective refractive index difference between the core and the cladding resulted in additional reduction of the scattering loss since the scattering loss is a strong function of the refractive index difference between the core and the cladding.

Figure 20:
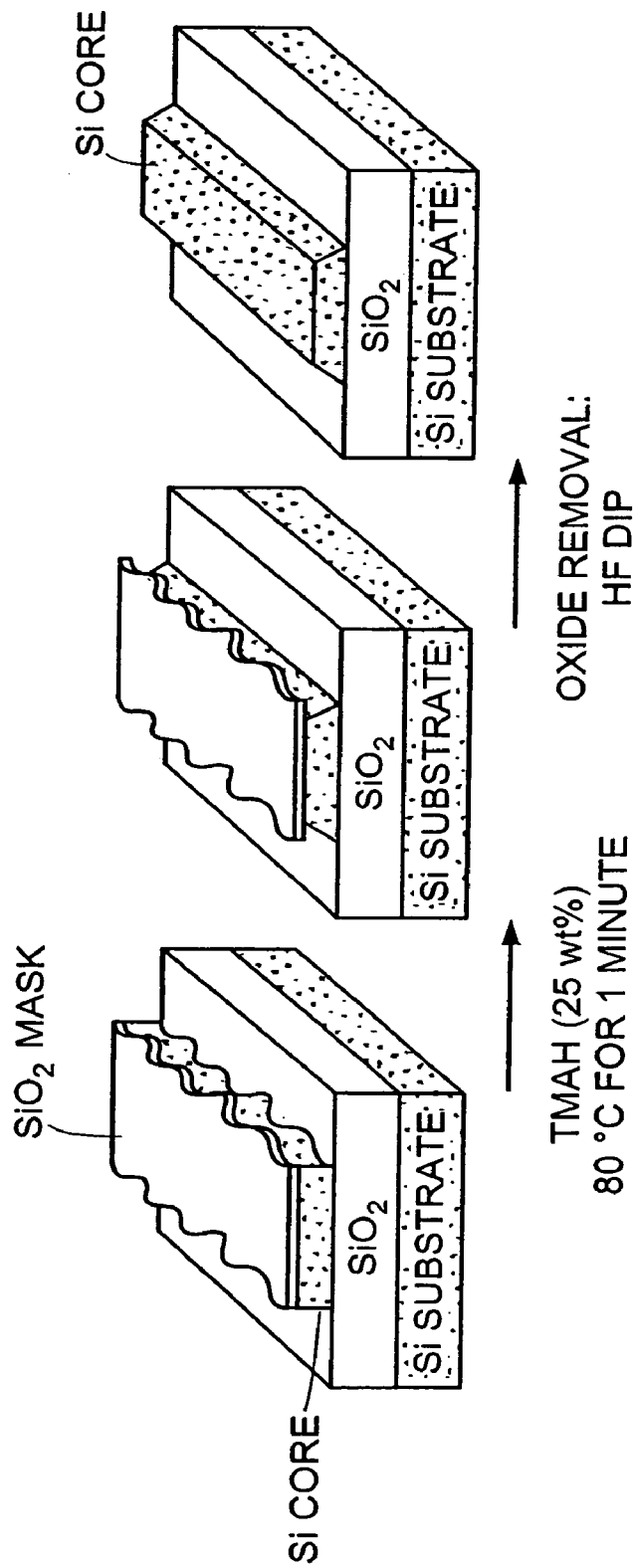
FIG. 20 is a perspective block diagram showing the fabrication steps of an anisotopic etching waveguide, for which the substrate is (100) Si and the $SiO_2$ mask is aligned in the <110> direction so that the resulting Si core reveals {111}-type surfaces on the sidewalls.

Subjecting the already-fabricated waveguide core to a wet chemical etch smoothens the core/cladding interface also reduces the roughness and thus reduces transmission losses. Both anisotropic and isotropic etchants can be used. When an anisotropic etchant is used to smooth a single-crystalline core material, some or all of the core surfaces can become crystal planes, resulting in atomically smooth surfaces. Examples of anisotropic etchants for single-crystalline silicon core are KOH (Potassium Hydroxide) and TMAH (Tetra-Methyl-Amine-Hydroxide). When an isotropic etchant is used, the etching process reduces the roughness on the core surfaces to minimize the energy of rough surfaces. To make $Si/SiO_2$ waveguides by anisotropic etching, a 0.34 µm-thick (100) Si layer of a SOI wafer sitting on a 1 µm-thick $SiO_2$ layer was patterned to provide a 3 µm SiO layer on top of a 0.2 µm-thick Si core layer. With reference to FIG. 20, the top $SiO_2$ layer then was patterned by photolithography and RIE to make a hard mask for the core of the waveguides that were in the <110> direction. The sample was then immersed in a 25-wt. % aqueous solution of NH OH (TMAH) at 80° C. for 1 min, which was sufficient to completely etch away Si from the nonwaveguide area. TMAH was used as the anisotropic etchant because of its compatibility with complementary metal-oxide semiconductor(CMOS) processing with no metal ions. The oxide hard mask was removed afterward. A blanket layer of 1 µm-thick $SiO_2$ film was deposited by plasma-enhanced chemical-vapor deposition on the waveguides as an upper cladding layer.

The AFM image of the anisotropically smoothed waveguide shows a {111}-type atomic plane, developed during the etching process by TMAH because of its anisotropic etching ratios, which are dependent on crystal orientation. {111} planes are the slowest etching planes since they are the lowest-energy surfaces. Since the waveguides are aligned along the <110> direction on the (100) Si surface, {111} surfaces are revealed on the waveguide sidewalls, with the mask on the top waveguide surface. {111} surfaces coincide with the cleavage planes of a (100) Si wafer, which make an angle of 54.7 degrees with the (100) Si surface which is the angle that the sidewalls make with the top surface. The AFM image analysis leads to rms values of about 2 nm for the anisotropic etched sample.

Transmission losses were determined for both oxidation smoothing and anisotropic etching samples. Transmission losses at $\lambda=1.54$ nm were measured using cutback, IR capture of scattered light and Fabry-Perot resonance methods. The oxidation smoothed single mode waveguides exhibited scattering loss of less than 0.8 dB/cm, and compared very favorably to comparably sized waveguides with no oxidation smoothing, which exhibited losses of over 30 dB/cm. The anisotropically etched sample exhibited similarly low loss. The scattering loss rapidly increases as the waveguide width is reduced in conventionally processed waveguides because of the increased sidewall roughness scattering. Such an effect was effectively suppressed in the oxidation smoothed waveguides. The rms roughness values for the oxidation smoothed and anisotropically etched sidewalls were only one-fifth that of the conventionally fabricated waveguide.

While exemplary embodiments of the invention have been illustrated by subjecting the already-fabricated $Si/SiO_2$ waveguide core to the oxidation reaction to reduce the core/cladding interface roughness and by wet chemical etching of the core/cladding interface, it will be appreciated that annealing the already-fabricated $Si/SiO_2$ waveguide core in an gaseous ambient including hydrogen gases at elevated temperatures smoothens the core/cladding interface, and can also reduce the roughness and thus reduce losses. The silicon core material undergoes a diffusive process that tends to minimize the energy of the rough core surface, smoothing the rough core/cladding interface. Annealing is conducted at elevated temperatures, e.g., at about 100° C.

Any references to front and back, right and left, top and bottom, upper and lower, and horizontal and vertical are, unless noted otherwise, intended for convenience of description, not to limit the present invention or its components to any one positional or spacial orientation. All dimensions of the components in the attached Figures can vary with a potential design and the intended use of an embodiment without departing from the scope of the invention.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. An optical chip, comprising:
   at least one large mode field size dielectric waveguide to interface with an external optical device, said at least one large mode field size dielectric wave guide comprises a low index difference waveguide and said optical device comprises a low index difference waveguide;
   at least one low minimum bending radius dielectric waveguide coupled to the large mode field size dielectric waveguide; and
   at least one optical function connected to the low minimum bending radius dielectric waveguide;
   wherein the large mode field size dielectric waveguide, the low minimum bending radius dielectric waveguide, and the optical function are fabricated monolithically on a single substrate.

2. The optical chip of claim 1, wherein the external optical device is a fiber optic waveguide.

3. The optical chip of claim 1, wherein the external optical device is selected from one or more of an edge emitting/receiving optical device and a vertically emitting/receiving optical device.

4. The optical chip of claim 1, wherein the external optical device is a large mode field size fiber optic waveguide on a separate chip.

5. The optical chip of claim 1, further comprising a coupler to couple the low minimum bending radius dielectric waveguide to the large mode field size dielectric waveguide, wherein the coupler includes:
a first dielectric channel waveguide including a first core material having a first tapered region surrounded by a cladding material; and
a second dielectric channel waveguide including a second core material having a second tapered region surrounded by the cladding material, a portion of said second tapered region being embedded within said first tapered region, wherein a first mode for propagating lightwaves defined by the first dielectric channel waveguide gradually transforms into a second mode defined by the second dielectric channel waveguide.

6. The optical chip of claim 5, wherein the embedded portion of said second tapered region of the coupler is completely surrounded by said first tapered region in a cross-section transverse to a mode transformation direction.

7. The optical chip of claim 5, wherein the first tapered region of the coupler gets narrower in width in direction toward the second dielectric channel waveguide, and wherein the second tapered region gets narrower in width in direction toward the first dielectric channel waveguide.

8. The optical chip of claim 7, wherein the first tapered region and the second tapered region are graded in the horizontal direction.

9. The optical chip of claim 8, wherein the first tapered region and the second tapered region are graded in the vertical direction.

10. The optical chip of claim 5, wherein the large mode field size dielectric waveguide is optically coupled to the first dielectric channel waveguide of the coupler.

11. The optical chip of claim 10, wherein the first mode defined by the first dielectric channel waveguide of the coupler is substantially the same as a mode defined by the large mode field size dielectric waveguide.

12. The optical chip of claim 10, wherein the low minimum bending radius dielectric waveguide is optically coupled to the second dielectric channel waveguide of the coupler.

13. The optical chip of claim 12, wherein the second mode defined by the second dielectric channel waveguide of the coupler is substantially the same as a mode defined by the low minimum bending radius dielectric waveguide.

14. The optical chip of claim 1, wherein the large mode field size dielectric waveguide is a low index difference dielectric waveguide, and wherein the low minimum bending radius dielectric waveguide is a high index difference dielectric waveguide 15. The optical chip of claim 14, wherein the low index difference dielectric waveguide includes a low index core and a cladding, wherein the index of refraction n~ of the low index core and the index of refraction n3 of the cladding are related as follows:

$$0 < \frac{n_1 - n_3}{n_3} < 0.1.$$

16. The optical chip of claim 15, wherein the high index difference dielectric waveguide includes a high index core and the cladding, wherein the index of refraction n2 of the high index core and the index of refraction n3 of the cladding are related as follows:

$$0.1 \le \frac{n_2 - n_3}{n_3}.$$

17. The optical chip of claim 15, wherein:

$$0 < \frac{n_1 - n_3}{n_3} < 0.04.$$

18. The optical chip of claim 16, wherein:

$$0 < \frac{n_1 - n_3}{n_3} < 0.01.$$

19. The optical chip of claim 18, wherein:

$$0.3 \le \frac{n_2 - n_3}{n_3}.$$

20. The optical chip of claim 1, wherein the low minimum bending radius dielectric waveguide includes:
a high index core material defining a channel; a first cladding region generally surrounding the high index core material, wherein a refractive index $n_2$ of the high index core material is greater than a refractive index $n_3$ of the first cladding region; and
a graded index region, wherein the graded index region is a separate region applied between at least one side of the high index core material and the first cladding region.

21. The optical chip of claim 20, wherein the graded index region has a refractive index that gradually changes from a refractive index of the high index core material to a refractive index of the first cladding region.

22. The optical chip of claim 20, wherein the at least one side having the graded index region is a rough edge of the high index core material.

23. The optical chip of claim 20, wherein the graded index region is applied between two rough sides of the high index core material and the first cladding region.

24. The optical chip of claim 20, wherein the graded index region is applied between each side of the high index core material and the first cladding region.

25. The optical chip of claim 20, wherein the first cladding region comprises two or more separate regions of cladding material.

26. The optical chip of claim 20, wherein the graded index region reduces scattering loss.

27. The optical chip of claim 1, wherein the optical function is any structure that performs at least one of generating, modifying, and measuring at least one of the amplitude, frequency, wavelength, dispersion, timing, propagation direction, and polarization properties of one or more light pulses.

28. An apparatus, comprising:
a first optical chip including:
at least one large mode size dielectric waveguide, said at least one large mode field size dielectric waveguide comprises a low index difference waveguide and is coupled to an optical device that comprises a low index difference waveguide;
at least one low minimum bending radius dielectric waveguide coupled to the large mode size dielectric waveguide; and
at least one optical function connected to the low minimum bending radius dielectric waveguide, wherein the optical function, large mode size dielectric waveguide, and low minimum bending radius dielectric waveguide are monolithically fabricated on a single substrate; and
a second optical chip including an emitting/receiving optical device to optically connect to the large mode size dielectric waveguide of the first optical chip.

29. The apparatus of claim 28, wherein a first end of the large mode size dielectric waveguide on the first optical chip includes an anti-reflection coating.

30. The apparatus of claim 28, wherein the emitting/receiving optical device on the second optical chip includes an anti-reflection coating.

31. An apparatus, comprising: an optical chip including
at least one large mode field size dielectric waveguide to interface with an external optical device said at least one large mode field size dielectric waveguide comprises a low index difference waveguide and said external optical device comprises a low index difference waveguide;
at least one low minimum bending radius dielectric waveguide coupled to the large mode field size dielectric waveguide;
at least one optical function connected to the low minimum bending radius dielectric waveguide, wherein the large mode field size dielectric waveguide, the low minimum bending radius dielectric waveguide, and the optical function are fabricated monolithically on a single substrate; and
at least one external large mode field size dielectric waveguide external to the optical chip and being optically connected to the optical chip.

32. The apparatus of claim 31, wherein a first end of the external large mode field size dielectric waveguide is optically connected to the large mode field size dielectric waveguide on the optical chip.

33. The apparatus of claim 32, wherein a second end of the external large mode field size dielectric waveguide can interface with external optical devices.

\* \* \* \* \*